(12) United States Patent
Chen et al.

(10) Patent No.: US 9,674,335 B2
(45) Date of Patent: Jun. 6, 2017

(54) MULTI-CONFIGURATION INPUT DEVICE

(71) Applicant: Microsoft Technology Licensing, LLC, Redmond, WA (US)

(72) Inventors: Able Chen, Shenzhen (CN); Wei Zheng, Shenzhen (CN); Sheau Jiun Yang, Beijing (CN); Po-Lin Ho, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/424,011

(22) PCT Filed: Oct. 30, 2014

(86) PCT No.: PCT/CN2014/089867
§ 371 (c)(1),
(2) Date: Feb. 25, 2015

(87) PCT Pub. No.: WO2016/065568
PCT Pub. Date: May 6, 2016

(65) Prior Publication Data
US 2016/0277562 A1    Sep. 22, 2016

(51) Int. Cl.
*H04B 1/38* (2015.01)
*H04M 1/725* (2006.01)
(Continued)

(52) U.S. Cl.
CPC .......... *H04M 1/72575* (2013.01); *G06F 1/16* (2013.01); *G06F 1/1669* (2013.01); *H04M 1/72527* (2013.01); *H04W 8/22* (2013.01)

(58) Field of Classification Search
CPC .......... H04M 1/72575; H04M 1/72527; G06F 1/1669; H04W 8/72
(Continued)

(56) References Cited

U.S. PATENT DOCUMENTS

| | | | |
|---|---|---|---|
| 4,823,283 | A | 4/1989 | Diehm et al. |
| 5,045,997 | A | 9/1991 | Watanabe |

(Continued)

FOREIGN PATENT DOCUMENTS

| | | |
|---|---|---|
| CN | 1650250 | 8/2005 |
| CN | 1749936 | 3/2006 |

(Continued)

OTHER PUBLICATIONS

"7 Genius Tablet Cover Features", retrieved from http://www.ebay.com/gds/7-Genius-Tablet-Cover-Features-/10000000177629377/g.html on Oct. 29, 2014, Apr. 28, 2014, 6 pages.

(Continued)

*Primary Examiner* — Marceau Milord

(57) ABSTRACT

A multi-configuration input device is described. In one or more examples, an input device comprises a connection portion configured to be secured to a mobile computing device using a magnetic connection, an input portion having one or more sensors configured to generate inputs responsive to user interaction, a support portion rotationally secured to the input portion and the connection portion and effective to assume a cover configuration in which the support portion and the input portion are positioned to cover a display device of the mobile computing device, and further effective to assume a stand configuration in which the support portion and the input portion are position at an acute angle with respect to one another, and an operating system selection key operable to select from a plurality of operating systems.

20 Claims, 6 Drawing Sheets

(51) Int. Cl.
    *G06F 1/16*     (2006.01)
    *H04W 8/22*     (2009.01)

(58) Field of Classification Search
    USPC .......................................................... 455/557
    See application file for complete search history.

(56) References Cited

U.S. PATENT DOCUMENTS

| | | | |
|---|---|---|---|
| 5,046,001 A | 9/1991 | Barker et al. | |
| 5,168,426 A | 12/1992 | Hoving et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,406,307 A | 4/1995 | Hirayama et al. | |
| 5,432,932 A | 7/1995 | Chen et al. | |
| 5,463,725 A | 10/1995 | Henckel et al. | |
| 5,485,197 A | 1/1996 | Hoarty | |
| 5,487,143 A | 1/1996 | Southgate | |
| 5,495,566 A | 2/1996 | Kwatinetz | |
| 5,515,495 A | 5/1996 | Ikemoto | |
| 5,574,836 A | 11/1996 | Broemmelsiek | |
| 5,598,523 A | 1/1997 | Fujita | |
| 5,603,053 A | 2/1997 | Gough et al. | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,675,329 A | 10/1997 | Barker et al. | |
| 5,687,331 A | 11/1997 | Volk et al. | |
| 5,712,995 A | 1/1998 | Cohn | |
| 5,771,042 A | 6/1998 | Santos-Gomez | |
| 5,793,415 A | 8/1998 | Gregory et al. | |
| 5,819,284 A | 10/1998 | Farber et al. | |
| 5,844,547 A | 12/1998 | Minakuchi et al. | |
| 5,859,636 A | 1/1999 | Pandit | |
| 5,860,073 A | 1/1999 | Ferrel et al. | |
| 5,889,517 A | 3/1999 | Ueda et al. | |
| 5,905,492 A | 5/1999 | Straub et al. | |
| 5,914,720 A | 6/1999 | Maples et al. | |
| 5,940,076 A | 8/1999 | Sommers et al. | |
| 5,943,041 A | 8/1999 | Allison et al. | |
| 5,959,621 A | 9/1999 | Nawaz et al. | |
| 5,963,204 A | 10/1999 | Ikeda et al. | |
| 6,008,809 A | 12/1999 | Brooks | |
| 6,008,816 A | 12/1999 | Eisler et al. | |
| 6,009,519 A | 12/1999 | Jones et al. | |
| 6,011,542 A | 1/2000 | Durrani et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,266,098 B1 | 7/2001 | Cove et al. | |
| 6,278,448 B1 | 8/2001 | Brown et al. | |
| 6,281,940 B1 | 8/2001 | Sciammarella | |
| 6,311,058 B1 | 10/2001 | Wecker et al. | |
| 6,346,935 B1 | 2/2002 | Nakajima et al. | |
| 6,369,837 B1 | 4/2002 | Schirmer | |
| 6,385,630 B1 | 5/2002 | Ejerhed | |
| 6,396,963 B2 | 5/2002 | Shaffer et al. | |
| 6,411,307 B1 | 6/2002 | Rosin et al. | |
| 6,424,338 B1 | 7/2002 | Andersone | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,582 B1 | 5/2003 | Sciammarella et al. | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 | 9/2003 | Dodson et al. | |
| 6,636,246 B1 | 10/2003 | Gallo et al. | |
| 6,662,023 B1 | 12/2003 | Helle | |
| 6,675,387 B1 | 1/2004 | Boucher et al. | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,727,894 B1 | 4/2004 | Karidis | |
| 6,784,925 B1 | 8/2004 | Tomat et al. | |
| 6,798,421 B2 | 9/2004 | Baldwin | |
| 6,798,649 B1 | 9/2004 | Olodort et al. | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,865,297 B2 | 3/2005 | Loui | |
| 6,873,329 B2 | 3/2005 | Cohen et al. | |
| 6,876,312 B2 | 4/2005 | Yu | |
| 6,885,974 B2 | 4/2005 | Holle | |
| 6,904,597 B2 | 6/2005 | Jin | |
| 6,920,445 B2 | 7/2005 | Bae | |
| 6,938,101 B2 | 8/2005 | Hayes et al. | |
| 6,961,731 B2 | 11/2005 | Holbrook | |
| 6,971,067 B1 | 11/2005 | Karson et al. | |
| 6,972,776 B2 | 12/2005 | Davis et al. | |
| 6,975,306 B2 | 12/2005 | Hinckley | |
| 6,975,507 B2 | 12/2005 | Wang et al. | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,019,964 B1 | 3/2006 | Maskatia et al. | |
| 7,025,274 B2 | 4/2006 | Solomon et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,054,441 B2 | 5/2006 | Pletikosa | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,194,506 B1 | 3/2007 | White et al. | |

(56) References Cited

U.S. PATENT DOCUMENTS

| | | |
|---|---|---|
| 7,197,702 B2 | 3/2007 | Niyogi et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,251,782 B1 | 7/2007 | Albers et al. |
| 7,262,775 B2 | 8/2007 | Calkins et al. |
| 7,263,668 B1 | 8/2007 | Lentz |
| 7,280,097 B2 | 10/2007 | Chen et al. |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,644,361 B2 | 1/2010 | Wu et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,765,490 B2 | 7/2010 | Lai et al. |
| 7,834,861 B2 | 11/2010 | Lee |
| 7,840,979 B2 | 11/2010 | Poling et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,898,529 B2 | 3/2011 | Fitzmaurice et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,050,030 B2 | 11/2011 | Wu et al. |
| 8,065,628 B2 | 11/2011 | Oshiro et al. |
| 8,077,151 B2 | 12/2011 | Morooka |
| 8,086,275 B2 | 12/2011 | Wykes |
| 8,108,781 B2 | 1/2012 | Laansoo et al. |
| 8,131,808 B2 | 3/2012 | Aoki et al. |
| 8,134,727 B1 | 3/2012 | Shmunis et al. |
| 8,138,869 B1 | 3/2012 | Lauder et al. |
| 8,150,924 B2 | 4/2012 | Buchheit et al. |
| 8,175,653 B2 | 5/2012 | Smuga |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,219,163 B2 | 7/2012 | Peng et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,255,818 B2 | 8/2012 | Bales et al. |
| 8,259,437 B2 | 9/2012 | Vesely |
| 8,269,736 B2 | 9/2012 | Wilairat |
| 8,272,104 B2 | 9/2012 | Chen et al. |
| 8,280,901 B2 | 10/2012 | McDonald |
| 8,289,688 B2 | 10/2012 | Behar et al. |
| 8,300,392 B2 | 10/2012 | Weng |
| 8,312,383 B2 | 11/2012 | Gilfix |
| 8,334,871 B2 | 12/2012 | Hamilton et al. |
| 8,355,698 B2 | 1/2013 | Teng et al. |
| 8,384,726 B1 | 2/2013 | Grabowski et al. |
| 8,385,952 B2 | 2/2013 | Friedman et al. |
| 8,411,046 B2 | 4/2013 | Kruzeniski et al. |
| 8,411,841 B2 | 4/2013 | Edwards et al. |
| 8,429,565 B2 | 4/2013 | Agarawala et al. |
| 8,429,842 B2 | 4/2013 | Vulgamott et al. |
| 8,448,083 B1 | 5/2013 | Migos et al. |
| 8,448,844 B2 | 5/2013 | Yan |
| 8,473,847 B2 | 6/2013 | Glover |
| 8,473,870 B2 | 6/2013 | Hinckley et al. |
| 8,498,100 B1 * | 7/2013 | Whitt, III .............. G06F 1/1618 361/679.17 |
| 8,525,808 B1 | 9/2013 | Buening |
| 8,525,852 B2 | 9/2013 | Dresel et al. |
| 8,527,852 B2 | 9/2013 | Muthu |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,548,854 B2 | 10/2013 | Sobol et al. |
| 8,549,430 B2 | 10/2013 | Russell et al. |
| 8,549,854 B2 | 10/2013 | Dion et al. |
| 8,560,856 B2 | 10/2013 | Sarikaya et al. |
| 8,560,959 B2 | 10/2013 | Zaman et al. |
| 8,584,150 B2 | 11/2013 | Wallace |
| 8,584,858 B2 | 11/2013 | Golias |
| 8,589,815 B2 | 11/2013 | Fong et al. |
| 8,589,858 B1 | 11/2013 | Watson |
| 8,599,542 B1 | 12/2013 | Healey et al. |
| 8,612,861 B2 | 12/2013 | Martinez et al. |
| 8,612,874 B2 | 12/2013 | Zaman et al. |
| 8,615,707 B2 | 12/2013 | Fortuna et al. |
| 8,615,713 B2 | 12/2013 | Sun et al. |
| 8,615,861 B2 | 12/2013 | Muxlow et al. |
| 8,627,227 B2 | 1/2014 | Matthews et al. |
| 8,627,862 B2 | 1/2014 | Pervan et al. |
| 8,639,819 B2 | 1/2014 | Pohja et al. |
| 8,639,863 B1 | 1/2014 | Kanapathippillai et al. |
| 8,687,023 B2 | 4/2014 | Markiewicz et al. |
| 8,687,868 B2 | 4/2014 | Fukutani et al. |
| 8,689,123 B2 | 4/2014 | Zaman et al. |
| 8,689,868 B2 | 4/2014 | Lerche et al. |
| 8,749,960 B2 | 6/2014 | Mori |
| 8,766,921 B2 | 7/2014 | Ballagas et al. |
| 8,811,008 B2 | 8/2014 | Selkirk et al. |

(56) References Cited

U.S. PATENT DOCUMENTS

| | | | |
|---|---|---|---|
| 8,812,029 B1* | 8/2014 | Cao | H04M 1/72522 455/456.1 |
| 8,839,953 B2 | 9/2014 | Igarashi | |
| 8,875,879 B2* | 11/2014 | Diebel | A45C 11/00 206/320 |
| 8,922,982 B1 | 12/2014 | Chen | |
| 8,988,876 B2 | 3/2015 | Corbin et al. | |
| 9,013,863 B2* | 4/2015 | Hsu | H05K 7/1401 206/320 |
| 9,078,338 B2 | 7/2015 | Ohtaka | |
| 9,082,407 B1* | 7/2015 | Faaborg | G10L 15/22 |
| 9,131,756 B2 | 9/2015 | Hurst et al. | |
| 9,189,019 B2 | 11/2015 | Jenkins et al. | |
| 9,280,181 B2 | 3/2016 | Tomita et al. | |
| 9,304,549 B2* | 4/2016 | Siddiqui | E05D 7/00 |
| 9,324,234 B2* | 4/2016 | Ricci | G06F 9/54 |
| 9,411,436 B2* | 8/2016 | Shaw | G06F 3/023 |
| 9,451,822 B2 | 9/2016 | Gu | |
| 9,532,631 B2 | 1/2017 | Gu | |
| 2001/0022621 A1 | 9/2001 | Squibbs | |
| 2002/0000963 A1 | 1/2002 | Yoshida et al. | |
| 2002/0018051 A1 | 2/2002 | Singh | |
| 2002/0035607 A1 | 3/2002 | Checkoway | |
| 2002/0054117 A1 | 5/2002 | van Dantzich et al. | |
| 2002/0060701 A1 | 5/2002 | Naughton et al. | |
| 2002/0070961 A1 | 6/2002 | Xu et al. | |
| 2002/0077156 A1 | 6/2002 | Smethers | |
| 2002/0091755 A1 | 7/2002 | Narin | |
| 2002/0097264 A1 | 7/2002 | Dutta et al. | |
| 2002/0105531 A1 | 8/2002 | Niemi | |
| 2002/0105553 A1 | 8/2002 | Segre | |
| 2002/0115476 A1 | 8/2002 | Padawer et al. | |
| 2002/0128036 A1 | 9/2002 | Yach et al. | |
| 2002/0129061 A1 | 9/2002 | Swart et al. | |
| 2002/0138248 A1 | 9/2002 | Corston-Oliver et al. | |
| 2002/0142762 A1 | 10/2002 | Chmaytelli et al. | |
| 2002/0145631 A1 | 10/2002 | Arbab et al. | |
| 2002/0152305 A1 | 10/2002 | Jackson et al. | |
| 2002/0154176 A1 | 10/2002 | Barksdale et al. | |
| 2002/0161634 A1 | 10/2002 | Kaars | |
| 2002/0186251 A1 | 12/2002 | Himmel et al. | |
| 2002/0194385 A1 | 12/2002 | Linder et al. | |
| 2003/0003899 A1 | 1/2003 | Tashiro et al. | |
| 2003/0008686 A1 | 1/2003 | Park et al. | |
| 2003/0011643 A1 | 1/2003 | Nishihata | |
| 2003/0020671 A1 | 1/2003 | Santoro et al. | |
| 2003/0040300 A1 | 2/2003 | Bodic | |
| 2003/0046396 A1 | 3/2003 | Richter et al. | |
| 2003/0073414 A1 | 4/2003 | Capps | |
| 2003/0096604 A1 | 5/2003 | Vollandt | |
| 2003/0105827 A1 | 6/2003 | Tan et al. | |
| 2003/0135582 A1 | 7/2003 | Allen et al. | |
| 2003/0146902 A1 | 8/2003 | Sandbach et al. | |
| 2003/0187996 A1 | 10/2003 | Cardina et al. | |
| 2003/0222907 A1 | 12/2003 | Heikes et al. | |
| 2003/0225846 A1 | 12/2003 | Heikes et al. | |
| 2003/0227491 A1 | 12/2003 | Moehrle | |
| 2003/0234799 A1 | 12/2003 | Lee | |
| 2004/0015553 A1 | 1/2004 | Griffin et al. | |
| 2004/0066414 A1 | 4/2004 | Czerwinski et al. | |
| 2004/0066418 A1 | 4/2004 | Tosey | |
| 2004/0068543 A1 | 4/2004 | Seifert | |
| 2004/0078299 A1 | 4/2004 | Down-Logan | |
| 2004/0111673 A1 | 6/2004 | Bowman et al. | |
| 2004/0165010 A1 | 8/2004 | Robertson et al. | |
| 2004/0185883 A1 | 9/2004 | Rukman | |
| 2004/0212586 A1 | 10/2004 | Denny | |
| 2004/0212617 A1 | 10/2004 | Fitzmaurice et al. | |
| 2004/0212954 A1 | 10/2004 | Ulla et al. | |
| 2004/0217954 A1 | 11/2004 | O'Gorman et al. | |
| 2004/0217980 A1 | 11/2004 | Radburn et al. | |
| 2004/0237048 A1 | 11/2004 | Tojo et al. | |
| 2004/0250217 A1 | 12/2004 | Tojo et al. | |
| 2005/0002158 A1* | 1/2005 | Olodort | G06F 1/1616 361/679.15 |
| 2005/0005241 A1 | 1/2005 | Hunleth et al. | |
| 2005/0028208 A1 | 2/2005 | Ellis et al. | |
| 2005/0044058 A1 | 2/2005 | Matthews et al. | |
| 2005/0052831 A1 | 3/2005 | Chen | |
| 2005/0054384 A1 | 3/2005 | Pasquale et al. | |
| 2005/0060647 A1 | 3/2005 | Doan et al. | |
| 2005/0060658 A1 | 3/2005 | Tsukiori | |
| 2005/0060665 A1 | 3/2005 | Rekimoto | |
| 2005/0079896 A1 | 4/2005 | Kokko et al. | |
| 2005/0085215 A1 | 4/2005 | Kokko | |
| 2005/0085272 A1 | 4/2005 | Anderson et al. | |
| 2005/0108655 A1 | 5/2005 | Andrea et al. | |
| 2005/0114788 A1 | 5/2005 | Fabritius | |
| 2005/0120306 A1 | 6/2005 | Klassen et al. | |
| 2005/0125739 A1 | 6/2005 | Thompson et al. | |
| 2005/0136953 A1 | 6/2005 | Jo | |
| 2005/0143138 A1 | 6/2005 | Lee et al. | |
| 2005/0149879 A1 | 7/2005 | Jobs et al. | |
| 2005/0168925 A1* | 8/2005 | Fang | G06F 1/1632 361/679.07 |
| 2005/0182798 A1 | 8/2005 | Todd et al. | |
| 2005/0183021 A1 | 8/2005 | Allen et al. | |
| 2005/0184999 A1 | 8/2005 | Daioku | |
| 2005/0198159 A1 | 9/2005 | Kirsch | |
| 2005/0198584 A1 | 9/2005 | Matthews et al. | |
| 2005/0200762 A1 | 9/2005 | Barletta et al. | |
| 2005/0216300 A1 | 9/2005 | Appelman et al. | |
| 2005/0223057 A1 | 10/2005 | Buchheit et al. | |
| 2005/0223069 A1 | 10/2005 | Cooperman et al. | |
| 2005/0232166 A1 | 10/2005 | Nierhaus | |
| 2005/0250547 A1 | 11/2005 | Salman et al. | |
| 2005/0258021 A1 | 11/2005 | Liu et al. | |
| 2005/0268237 A1 | 12/2005 | Crane et al. | |
| 2005/0273614 A1 | 12/2005 | Ahuja et al. | |
| 2005/0280719 A1 | 12/2005 | Kim et al. | |
| 2006/0004685 A1 | 1/2006 | Pyhalammi et al. | |
| 2006/0005207 A1 | 1/2006 | Louch et al. | |
| 2006/0007645 A1 | 1/2006 | Chen et al. | |
| 2006/0010394 A1 | 1/2006 | Chaudhri et al. | |
| 2006/0015562 A1 | 1/2006 | Kilian-Kehr et al. | |
| 2006/0015736 A1 | 1/2006 | Callas et al. | |
| 2006/0015812 A1 | 1/2006 | Cunningham | |
| 2006/0015820 A1 | 1/2006 | Wood | |
| 2006/0026013 A1 | 2/2006 | Kraft | |
| 2006/0026521 A1 | 2/2006 | Hotelling et al. | |
| 2006/0036425 A1 | 2/2006 | Le Cocq et al. | |
| 2006/0048073 A1 | 3/2006 | Jarrett et al. | |
| 2006/0048101 A1 | 3/2006 | Krassovsky et al. | |
| 2006/0059430 A1 | 3/2006 | Bells | |
| 2006/0070005 A1 | 3/2006 | Gilbert et al. | |
| 2006/0074735 A1 | 4/2006 | Shukla et al. | |
| 2006/0074771 A1 | 4/2006 | Kim | |
| 2006/0075360 A1 | 4/2006 | Bixler | |
| 2006/0085764 A1 | 4/2006 | Klementiev | |
| 2006/0103623 A1 | 5/2006 | Davis | |
| 2006/0107231 A1 | 5/2006 | Matthews et al. | |
| 2006/0112354 A1 | 5/2006 | Park et al. | |
| 2006/0114239 A1 | 6/2006 | Nakajima | |
| 2006/0129543 A1 | 6/2006 | Bates et al. | |
| 2006/0133052 A1 | 6/2006 | Harmon et al. | |
| 2006/0135220 A1 | 6/2006 | Kim et al. | |
| 2006/0136773 A1 | 6/2006 | Kespohl et al. | |
| 2006/0152803 A1 | 7/2006 | Provitola | |
| 2006/0156247 A1 | 7/2006 | McCormack et al. | |
| 2006/0172724 A1 | 8/2006 | Linkert et al. | |
| 2006/0173911 A1 | 8/2006 | Levin et al. | |
| 2006/0184901 A1 | 8/2006 | Dietz | |
| 2006/0190833 A1 | 8/2006 | SanGiovanni et al. | |
| 2006/0192689 A1 | 8/2006 | Wang et al. | |
| 2006/0199598 A1 | 9/2006 | Lee et al. | |
| 2006/0212806 A1 | 9/2006 | Griffin et al. | |
| 2006/0218234 A1 | 9/2006 | Deng et al. | |
| 2006/0218501 A1 | 9/2006 | Wilson et al. | |
| 2006/0224993 A1 | 10/2006 | Wong et al. | |
| 2006/0246955 A1 | 11/2006 | Nirhamo | |
| 2006/0248471 A1 | 11/2006 | Lindsay et al. | |
| 2006/0253801 A1 | 11/2006 | Okaro et al. | |
| 2006/0259870 A1 | 11/2006 | Hewitt et al. | |
| 2006/0259873 A1 | 11/2006 | Mister | |

(56) References Cited

U.S. PATENT DOCUMENTS

| | | |
|---|---|---|
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0021012 A1 | 1/2007 | Ogawa et al. |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0044039 A1 | 2/2007 | Amadio et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0136677 A1 | 6/2007 | Agarwal |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157099 A1 | 7/2007 | Haug |
| 2007/0157106 A1 | 7/2007 | Bishop |
| 2007/0171192 A1 | 7/2007 | Seo et al. |
| 2007/0171238 A1 | 7/2007 | Ubillos et al. |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0217129 A1 | 9/2007 | Chuang et al. |
| 2007/0225022 A1 | 9/2007 | Satake |
| 2007/0233654 A1 | 10/2007 | Karlson et al. |
| 2007/0236468 A1 | 10/2007 | Tuli |
| 2007/0238487 A1 | 10/2007 | Kuhl et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0270193 A1 | 11/2007 | Hsieh |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0291007 A1 | 12/2007 | Forlines et al. |
| 2008/0005668 A1 | 1/2008 | Mavinkurve et al. |
| 2008/0028294 A1 | 1/2008 | Sell et al. |
| 2008/0032681 A1 | 2/2008 | West |
| 2008/0036743 A1 | 2/2008 | Westerman et al. |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0059913 A1 | 3/2008 | Burtner et al. |
| 2008/0062318 A1 | 3/2008 | Ellis et al. |
| 2008/0065607 A1 | 3/2008 | Weber |
| 2008/0066010 A1 | 3/2008 | Brodersen et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120571 A1 | 5/2008 | Chang et al. |
| 2008/0122796 A1 | 5/2008 | Jobs et al. |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez et al. |
| 2008/0301575 A1 | 12/2008 | Fermon |

(56) References Cited

U.S. PATENT DOCUMENTS

| | | |
|---|---|---|
| 2008/0307345 A1 | 12/2008 | Hart et al. |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0316177 A1 | 12/2008 | Tseng |
| 2008/0317240 A1 | 12/2008 | Chang et al. |
| 2008/0320413 A1 | 12/2008 | Oshiro et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0061956 A1 | 3/2009 | Matsuoka |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel et al. |
| 2009/0089215 A1 | 4/2009 | Newton |
| 2009/0089459 A1 | 4/2009 | Jeyaseelan et al. |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109243 A1 | 4/2009 | Kraft et al. |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0158144 A1 | 6/2009 | Griffin |
| 2009/0159763 A1 | 6/2009 | Kim |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189915 A1 | 7/2009 | Mercer et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0283654 A1 | 11/2009 | Hu |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0322760 A1 | 12/2009 | Kwiatkowski et al. |
| 2009/0327904 A1 | 12/2009 | Guzak et al. |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski et al. |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher et al. |
| 2010/0107100 A1 | 4/2010 | Schneekloth |
| 2010/0122110 A1 | 5/2010 | Ordogh |
| 2010/0122924 A1 | 5/2010 | Andrews |
| 2010/0131901 A1 | 5/2010 | Takahashi et al. |
| 2010/0138767 A1 | 6/2010 | Wang et al. |
| 2010/0138834 A1 | 6/2010 | Agarwal et al. |
| 2010/0145675 A1 | 6/2010 | Lloyd et al. |
| 2010/0146437 A1 | 6/2010 | Woodcock et al. |
| 2010/0157157 A1 | 6/2010 | Yi |
| 2010/0159966 A1 | 6/2010 | Friedman et al. |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0192102 A1 | 7/2010 | Chmielewski et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |

(56) References Cited

U.S. PATENT DOCUMENTS

| | | |
|---|---|---|
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Zednicek et al. |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0325411 A1 | 12/2010 | Jung et al. |
| 2010/0328431 A1 | 12/2010 | Kim et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0043527 A1 | 2/2011 | Ording et al. |
| 2011/0050063 A1* | 3/2011 | Wang .............. H04N 1/00127 312/351.1 |
| 2011/0055773 A1 | 3/2011 | Agarawala et al. |
| 2011/0057953 A1 | 3/2011 | Horodezky |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0109563 A1 | 5/2011 | Liu |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0138319 A1 | 6/2011 | Sidman |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167341 A1 | 7/2011 | Cranfill et al. |
| 2011/0170252 A1 | 7/2011 | Jones et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0179368 A1 | 7/2011 | King et al. |
| 2011/0179386 A1 | 7/2011 | Shaffer et al. |
| 2011/0179387 A1 | 7/2011 | Shaffer et al. |
| 2011/0184960 A1 | 7/2011 | Delpha et al. |
| 2011/0185318 A1 | 7/2011 | Hinckley et al. |
| 2011/0191675 A1 | 8/2011 | Kauranen |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0216064 A1 | 9/2011 | Dahl et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0276864 A1 | 11/2011 | Oules |
| 2011/0279461 A1 | 11/2011 | Hamilton et al. |
| 2011/0290687 A1 | 12/2011 | Han |
| 2011/0296337 A1 | 12/2011 | Louch et al. |
| 2011/0297564 A1 | 12/2011 | Kim et al. |
| 2011/0297566 A1 | 12/2011 | Gallagher et al. |
| 2011/0316884 A1 | 12/2011 | Giambalvo et al. |
| 2011/0320978 A1 | 12/2011 | Horodezky et al. |
| 2012/0005584 A1 | 1/2012 | Seago et al. |
| 2012/0009000 A1 | 1/2012 | Starrett |
| 2012/0009903 A1 | 1/2012 | Schultz et al. |
| 2012/0023101 A1 | 1/2012 | Heimendinger et al. |
| 2012/0028687 A1 | 2/2012 | Wykes |
| 2012/0037285 A1 | 2/2012 | Diebel et al. |
| 2012/0037523 A1 | 2/2012 | Diebel et al. |
| 2012/0050185 A1 | 3/2012 | Davydov et al. |
| 2012/0050332 A1 | 3/2012 | Nikara et al. |
| 2012/0054778 A1 | 3/2012 | Russell et al. |
| 2012/0057288 A1 | 3/2012 | Chou et al. |
| 2012/0072853 A1 | 3/2012 | Krigstrom et al. |
| 2012/0072953 A1 | 3/2012 | James et al. |
| 2012/0084704 A1 | 4/2012 | Lee et al. |
| 2012/0102433 A1 | 4/2012 | Falkenburg |
| 2012/0125791 A1 | 5/2012 | Parker et al. |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0166471 A1 | 6/2012 | Ramamurthy et al. |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0194448 A1 | 8/2012 | Rothkopf |
| 2012/0210265 A1 | 8/2012 | Delia et al. |
| 2012/0211377 A1 | 8/2012 | Sajid |
| 2012/0212495 A1 | 8/2012 | Butcher |
| 2012/0216139 A1 | 8/2012 | Ording et al. |
| 2012/0224316 A1 | 9/2012 | Shulenberger |
| 2012/0233571 A1 | 9/2012 | Wever et al. |
| 2012/0235930 A1 | 9/2012 | Lazaridis et al. |
| 2012/0243163 A1 | 9/2012 | Kim |
| 2012/0244841 A1 | 9/2012 | Teng et al. |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0278727 A1 | 11/2012 | Ananthakrishnan et al. |
| 2012/0290962 A1 | 11/2012 | Zielinski et al. |
| 2012/0293953 A1 | 11/2012 | Wu et al. |
| 2012/0299968 A1 | 11/2012 | Wong et al. |
| 2012/0300383 A1 | 11/2012 | Lauder et al. |
| 2012/0304068 A1 | 11/2012 | Zaman et al. |
| 2012/0304092 A1 | 11/2012 | Jarrett et al. |
| 2012/0304103 A1 | 11/2012 | LeVee et al. |
| 2012/0304106 A1 | 11/2012 | LeVee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0314342 A1 | 12/2012 | Sheu et al. |
| 2012/0323992 A1 | 12/2012 | Brobst et al. |
| 2012/0327580 A1 | 12/2012 | Gengler |
| 2013/0033525 A1 | 2/2013 | Markiewicz et al. |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz et al. |
| 2013/0047079 A1 | 2/2013 | Kroeger et al. |
| 2013/0047105 A1 | 2/2013 | Jarrett |

(56) References Cited

U.S. PATENT DOCUMENTS

| | | |
|---|---|---|
| 2013/0047117 A1 | 2/2013 | Deutsch |
| 2013/0047126 A1 | 2/2013 | Sareen |
| 2013/0057572 A1 | 3/2013 | Anderson et al. |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard et al. |
| 2013/0067420 A1 | 3/2013 | Pittappilly |
| 2013/0083953 A1 | 4/2013 | Chang |
| 2013/0087517 A1 | 4/2013 | Zhong |
| 2013/0088431 A1 | 4/2013 | Ballagas et al. |
| 2013/0093757 A1 | 4/2013 | Cornell |
| 2013/0102366 A1 | 4/2013 | Teng |
| 2013/0107438 A1 | 5/2013 | Lee et al. |
| 2013/0114198 A1 | 5/2013 | Gengler |
| 2013/0134061 A1 | 5/2013 | Wu et al. |
| 2013/0145244 A1 | 6/2013 | Rothschiller et al. |
| 2013/0159900 A1 | 6/2013 | Pendharkar |
| 2013/0167058 A1 | 6/2013 | LeVee |
| 2013/0174070 A1 | 7/2013 | Briand |
| 2013/0175200 A1* | 7/2013 | Poon ............... F16M 13/00 206/759 |
| 2013/0175909 A1 | 7/2013 | Wang et al. |
| 2013/0178155 A1 | 7/2013 | Shulenberger |
| 2013/0179781 A1 | 7/2013 | Nan et al. |
| 2013/0220043 A1 | 8/2013 | hsu et al. |
| 2013/0227482 A1 | 8/2013 | Thorsander et al. |
| 2013/0227483 A1 | 8/2013 | Thorsander et al. |
| 2013/0229356 A1 | 9/2013 | Marwah et al. |
| 2013/0235521 A1 | 9/2013 | Burch et al. |
| 2013/0242490 A1 | 9/2013 | Ku |
| 2013/0268422 A1 | 10/2013 | Ram et al. |
| 2013/0270980 A1 | 10/2013 | Hsu |
| 2013/0277271 A1 | 10/2013 | Toulotte |
| 2013/0297700 A1 | 11/2013 | Hayton et al. |
| 2013/0329375 A1 | 12/2013 | Chiang et al. |
| 2013/0334020 A1 | 12/2013 | Lan |
| 2013/0339904 A1 | 12/2013 | Geithner |
| 2014/0024312 A1 | 1/2014 | Guida |
| 2014/0029189 A1 | 1/2014 | Chang et al. |
| 2014/0055937 A1 | 2/2014 | Wang |
| 2014/0071603 A1 | 3/2014 | Matsuoka et al. |
| 2014/0071607 A1 | 3/2014 | Frinak et al. |
| 2014/0074909 A1 | 3/2014 | Gunderson et al. |
| 2014/0082552 A1 | 3/2014 | Zaman |
| 2014/0083883 A1 | 3/2014 | Elias |
| 2014/0109008 A1 | 4/2014 | Zaman |
| 2014/0123072 A1 | 5/2014 | Bhowmick et al. |
| 2014/0185845 A1 | 7/2014 | Udesen |
| 2014/0195963 A1 | 7/2014 | Cheung |
| 2014/0211393 A1 | 7/2014 | Lee |
| 2014/0218855 A1 | 8/2014 | Fujino |
| 2014/0254079 A1 | 9/2014 | Yang |
| 2014/0262854 A1 | 9/2014 | Chen et al. |
| 2014/0298062 A1 | 10/2014 | Lee |
| 2014/0298226 A1 | 10/2014 | Jin |
| 2014/0311880 A1 | 10/2014 | Krumpelman et al. |
| 2014/0328479 A1 | 11/2014 | Epiktetov |
| 2014/0332418 A1 | 11/2014 | Cheung et al. |
| 2014/0380232 A1 | 12/2014 | Sarnoff et al. |
| 2015/0001105 A1 | 1/2015 | Nyholm et al. |
| 2015/0027603 A1 | 1/2015 | Mogol |
| 2015/0055284 A1* | 2/2015 | Han ............... G06F 1/1616 361/679.12 |
| 2015/0122850 A1 | 5/2015 | Quehl |
| 2015/0160828 A1 | 6/2015 | Wang et al. |
| 2015/0186397 A1 | 7/2015 | Cueto et al. |
| 2015/0280768 A1 | 10/2015 | Huang |
| 2015/0286350 A1 | 10/2015 | Gu |
| 2015/0286351 A1 | 10/2015 | Gu |
| 2015/0286352 A1 | 10/2015 | Gu |
| 2015/0286387 A1 | 10/2015 | Gu |
| 2015/0293564 A1 | 10/2015 | Gu |
| 2015/0293601 A1 | 10/2015 | Gu |
| 2015/0293606 A1 | 10/2015 | Gu |
| 2015/0296060 A1 | 10/2015 | Gu |
| 2016/0027399 A1* | 1/2016 | Wilde ............... G06F 13/382 345/520 |
| 2016/0179253 A1 | 6/2016 | Franklin et al. |
| 2016/0259427 A1 | 9/2016 | Zheng et al. |

FOREIGN PATENT DOCUMENTS

| | | |
|---|---|---|
| CN | 1936797 | 3/2007 |
| CN | 101006425 | 7/2007 |
| CN | 101075174 | 11/2007 |
| CN | 101114303 | 1/2008 |
| CN | 101150798 | 3/2008 |
| CN | 101228570 | 7/2008 |
| CN | 101316401 | 12/2008 |
| CN | 101354649 | 1/2009 |
| CN | 201477524 | 5/2010 |
| CN | 101809531 | 8/2010 |
| CN | 201556164 | 8/2010 |
| CN | 101976099 | 2/2011 |
| CN | 201741069 U | 2/2011 |
| CN | 102197702 | 9/2011 |
| CN | 202075698 | 12/2011 |
| CN | 202206156 | 4/2012 |
| CN | 102520803 | 6/2012 |
| CN | 102624970 | 8/2012 |
| CN | 202472496 U | 10/2012 |
| CN | 202748732 | 2/2013 |
| CN | 202870736 | 4/2013 |
| CN | 202904485 | 4/2013 |
| CN | 103105995 | 5/2013 |
| CN | 202956726 | 5/2013 |
| CN | 203025612 | 6/2013 |
| CN | 203164868 | 8/2013 |
| CN | 203241925 | 10/2013 |
| CN | 103513715 | 1/2014 |
| CN | 103629493 | 3/2014 |
| DE | 202010008665 | 12/2010 |
| DE | 202010014418 | 3/2011 |
| EP | 0583060 | 2/1994 |
| EP | 0965932 | 12/1999 |
| EP | 1337093 | 8/2003 |
| EP | 1526463 | 4/2005 |
| EP | 1752868 | 2/2007 |
| EP | 2535809 | 12/2012 |
| EP | 2677515 | 12/2013 |
| JP | 2004227393 | 8/2004 |
| JP | 2004357257 | 12/2004 |
| JP | 2006139615 | 6/2006 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 102008004180 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 1020090041635 | 4/2009 |
| KR | 20090053143 | 5/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| WO | WO-9926127 | 5/1999 |

(56) References Cited

FOREIGN PATENT DOCUMENTS

| WO | WO-0129976 | 4/2001 |
|---|---|---|
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |
| WO | WO-2011041885 | 4/2011 |
| WO | WO-2013158110 | 10/2013 |

OTHER PUBLICATIONS

"Adobe Acrobat 8 Standard User Guide", Adobe Systems Incorporated, 2007, pp. 34 & 36.
"Advisory Action", U.S. Appl. No. 12/414,382, Jan. 20, 2012, 3 pages.
"Advisory Action", U.S. Appl. No. 12/433,605, Apr. 5, 2012, 3 pages.
"Airbender 2.0", Retrieved From: <http://www.newtrent.com/airbender-2-0-nt30b.html> Mar. 31, 2014, 2013, 2 Pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, Nov. 20, 2008, 1 page.
"Blackberry 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-4-/200999748037> Mar. 31, 2014, Mar. 19, 2014, 3 Pages.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry/com/developers/docs/6.0.0api/net/rim/device/api/ui/ScrollView.html> Sep. 28, 2010, 13 pages.
"Content-Centric E-Mail Message Analysis in Litigation Document Reviews", Retrieved from: <http://www.busmanagement.com/articl/Issue-14/Data/Management/Content-Centric-E-Mail-Message-Analysis-in-Litigation-Document-Reviews/> on May 6, 2009, 2009, 5 Pages.
"Daphne v1.47", retrieved from <http://www.frk.com.ar/daphne.php> on Nov. 18, 2011, 3 pages.
"Dial a number", Retrieved from: <http://www.phonespell.org/ialhelp.html> on Nov. 20, 2008, Nov. 20, 2008, Nov. 20, 2008, 1 page.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on Mar. 13, 2009, 2 pages.
"Email Notification for Microsoft Outlook and Outlook Express", Retrieved from: <http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.pdf>,Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, Apr. 10, 2012, 7 pages.
"Extended European Search Report", EP Application No. 09822736.6, Dec. 18, 2012, 7 pages.
"Extended European Search Report", EP Application No. 10762112.0, Aug. 2, 2013, 7 Pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.
"Final Office Action", U.S. Appl. No. 11/305,789, Apr. 1, 2009, 10 pages.
"Final Office Action", U.S. Appl. No. 11/502,264, Feb. 4, 2010, 15 pages.
"Final Office Action", U.S. Appl. No. 11/502,264, Mar. 29, 2013, 16 pages.
"Final Office Action", U.S. Appl. No. 11/502,264, Apr. 3, 2009, 9 pages.
"Final Office Action", U.S. Appl. No. 12/244,545, Dec. 7, 2011, 16 pages.
"Final Office Action", U.S. Appl. No. 12/244,545, Sep. 7, 2012, 23 pages.
"Final Office Action", U.S. Appl. No. 12/413,977, Nov. 17, 2011, 16 pages.
"Final Office Action", U.S. Appl. No. 12/414,382, Dec. 23, 2011, 7 pages.
"Final Office Action", U.S. Appl. No. 12/414,476, Apr. 8, 2013, 25 pages.
"Final Office Action", U.S. Appl. No. 12/414,476, Dec. 1, 2011, 20 pages.
"Final Office Action", U.S. Appl. No. 12/433,605, Jul. 17, 2013, 13 pages.
"Final Office Action", U.S. Appl. No. 12/433,605, Feb. 3, 2012, 11 pages.
"Final Office Action", U.S. Appl. No. 12/433,667, Jan. 7, 2013, 17 pages.
"Final Office Action", U.S. Appl. No. 12/433,667, Sep. 13, 2011, 17 pages.
"Final Office Action", U.S. Appl. No. 12/469,458, Feb. 1, 2013, 19 pages.
"Final Office Action", U.S. Appl. No. 12/469,458, Nov. 17, 2011, 15 pages.
"Final Office Action", U.S. Appl. No. 12/469,480, Apr. 10, 2013, 21 pages.
"Final Office Action", U.S. Appl. No. 12/469,480, Feb. 9, 2012, 17 pages.

(56) References Cited

OTHER PUBLICATIONS

"Final Office Action", U.S. Appl. No. 12/480,969, Nov. 23, 2012, 18 pages.
"Final Office Action", U.S. Appl. No. 12/480,969, Jul. 24, 2013, 19 pages.
"Final Office Action", U.S. Appl. No. 12/484,799, Apr. 30, 2012, 13 pages.
"Final Office Action", U.S. Appl. No. 12/560,081, Mar. 14, 2012, 16 pages.
"Final Office Action", U.S. Appl. No. 12/577,400, Aug. 16, 2013, 25 pages.
"Final Office Action", U.S. Appl. No. 12/577,400, Sep. 14, 2012, 26 pages.
"Final Office Action", U.S. Appl. No. 12/721,422, Mar. 7, 2013, 10 pages.
"Final Office Action", U.S. Appl. No. 12/972,967, Oct. 11, 2013, 21 pages.
"Final Office Action", U.S. Appl. No. 12/983,106, Oct. 7, 2013, 19 pages.
"Final Office Action", U.S. Appl. No. 13/073,300, Apr. 1, 2014, 14 pages.
"Final Office Action", U.S. Appl. No. 13/118,181, Dec. 20, 2013, 18 pages.
"Final Office Action", U.S. Appl. No. 13/118,204, Nov. 21, 2013, 24 pages.
"Final Office Action", U.S. Appl. No. 13/118,221, Mar. 17, 2014, 21 pages.
"Final Office Action", U.S. Appl. No. 13/118,321, Dec. 19, 2013, 30 pages.
"Final Office Action", U.S. Appl. No. 13/118,333, Apr. 23, 2014, 22 pages.
"Final Office Action", U.S. Appl. No. 13/118,339, Aug. 22, 2013, 21 pages.
"Final Office Action", U.S. Appl. No. 13/118,347, Aug. 15, 2013, 25 pages.
"Final Office Action", U.S. Appl. No. 13/224,258, Sep. 11, 2013, 37 pages.
"Final Office Action", U.S. Appl. No. 13/229,693, Sep. 4, 2013, 23 pages.
"Final Office Action", U.S. Appl. No. 13/335,001, Nov. 22, 2013, 18 pages.
"Final Office Action", U.S. Appl. No. 13/345,383, Jul. 30, 2013, 27 pages.
"Final Office Action", U.S. Appl. No. 13/655,386, Jun. 6, 2013, 34 pages.
"Final Office Action", U.S. Appl. No. 13/656,354, Jun. 17, 2013, 14 pages.
"Final Office Action", U.S. Appl. No. 13/656,574, Aug. 23, 2013, 20 pages.
"Final Office Action", U.S. Appl. No. 13/657,621, Sep. 10, 2013, 18 pages.
"Final Office Action", U.S. Appl. No. 13/657,646, May 6, 2013, 12 pages.
"Final Office Action", U.S. Appl. No. 13/657,789, Jun. 21, 2013, 35 pages.
"Final Office Action", U.S. Appl. No. 13/658,694, Oct. 30, 2013, 17 pages.
"Flexible Water Resistant Full Size Keyboard USB", Retrieved from <http://www.fentek-ind.com/kbflusbps2b.htm#.VFCJpbUcwnt>, Jan. 26, 2013, 6 pages.
"Foreign Office Action", CN Application No. 200980142644.1, Aug. 20, 2013, 9 Pages.
"Foreign Office Action", CN Application No. 200980142661.5, Sep. 24, 2013, 8 Pages.
"Foreign Office Action", JP Application No. 2011-533353, Jul. 5, 2013, 9 Pages.
"Foreign Office Action", CL Application No. 2379-2011, Jul. 3, 2013, 8 pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Apr. 3, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080045865.X, Dec. 4, 2012, 10 pages.
"Foreign Office Action", CN Application No. 201080045865.X, Jun. 4, 2013, 10 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Foreign Office Action", EP Application No. 10823883.3, Aug. 10, 2012, 5 pages.
"Foreign Office Action", JP Application No. 2012-503523, Apr. 22, 2013, 5 Pages.
"Freeware.mobi", Retrieved from: <http://www.palmfreeware.mobi/download-palette.html> on Nov. 6, 2008, Oct. 9, 2001, 2 pages.
"Getting started with Logitech® Fold-Up Keyboard", Retrieved from <http://www.logitech.com/assets/42319/fold-up-keyboard-for-ipad-2-quick-startguide.pdf>, May 27, 2012, 12 pages.
"GnomeCanvas", Retrieved from: <http://library.gnome.org/devel/libgnomecanvas/unstable/GnomeCanvas.html> on Sep. 28, 2010, 11 pages.
"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.
"Heatmap", Retrieved From: <https://supportgoogle.com/drive/answer/91599?hl=en> Mar. 29, 2014, 2 Pages.
"How Do I Cancel a "Drag" Motion on an Android Seekbar?", retrieved from <http://stackoverflow.com/questions/2917969/how-do-i-cancel-a-drag-motion-on-anandroid-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"How-to Close an Application in BlackBerry PlayBook?", retrieved from <http://stackoverflow.com/questions/5277027/how-to-close-an-application-in-blackberry-playbook> on Nov. 18, 2011, 2 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen-New iPhone App Shows Today Screen Type Info in Lock Screen", Retrieved from: <http://justanotheriphoneblog.com/wordpress//2008/05/13/intelliscreennew-iphone-app-shows-today-screen-type-info-on-lock-screen/> on Nov. 12, 2008, May 13, 2008, 11 pages.

(56) References Cited

OTHER PUBLICATIONS

"International Search Report and Written Opinion", Application No. PCT/US2010/028555, Oct. 12, 2010, 10 pages.
"International Search Report and Written Opinion", Application No. PCT/US2010/028699, Oct. 4, 2010, 10 pages.
"International Search Report and Written Opinion", Application No. PCT/US2013/059563, Nov. 7, 2013, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2010/034772, Dec. 29, 2010, 12 pages.
"International Search Report and Written Opinion", Application No. PCT/CN2014/074793, Sep. 30, 2014, 15 pages.
"International Search Report and Written Opinion", Application No. PCT/US2012/047091, Dec. 27, 2012, 15 pages.
"International Search Report and Written Opinion", Application No. PCT/CN2014/075046, Oct. 28, 2014, 16 pages.
"International Search Report and Written Opinion", Application No. PCT/US2013/061066, Feb. 4, 2014, 17 pages.
"International Search Report and Written Opinion", Application No. PCT/US2010/038730, Jan. 19, 2011, 8 pages.
"International Search Report and Written Opinion", Application No. PCT/US2011/055513, Mar. 27, 2012, 8 pages.
"International Search Report and Written Opinion", Application No. PCT/US2010/052119, May 2, 2011, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, Sep. 26/212, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.
"International Search Report and Written Opinion", Application No. PCT/US2010/028553, Application Filing Date: Mar. 24, 2010, Nov. 9, 2010, 9 pages.

"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"iwerkz Universal Foldable Bluetooth Keyboard", Retrieved from <http://mywerkz.com/wordpress/wpcontent/uploads/2013/10/44652_Manual_FoldGuide_9_23A.pdf>, 2014, 2 pages.
"Keyboard (5)", Retrieved from: <http://landru.uwaterloo.ca/cgibin/man.cgi?section=5&topic=keyboard> on Dec. 11, 2008., Aug. 11, 1997, 8 Pages.
"Keyboard Case Adjustable 10inch Rotating Stand Bluetooth USB Apple Ipad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"Keyboard Shortcuts", Retrieved from: <http://www.pctoday.com/editorial/article.asp?article=articlee%2F2005%2Ft0311%2F26t11%2F26t11.asp> on Aug. 3, 2009., Nov. 2005, 5 pages.
"KeyFolio Pro™ for iPad Air", Retrieved From:<http://www.kensington.com/kensington/us/us/s/3478/keyfolio-pro%E2%84%A2-for-ipad-air.aspx#.UxYF5PIdV8F> Feb. 26, 2014, Dec. 15, 2013, 2 Pages.
"KeyFolio Thin X2™ for iPad® Air", retrieved from http://www.kensington.com/ce/ca/v/4462/1758/keyfolio-thin-x2™-for-ipad®-air#.VFBuffnLcpo on Oct. 29, 2014, 3 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Magic mouse", Retrieved from: <http://www.apple.com/magicmouse/> on May 10, 2011, 3 pages.
"Meet ClamCase Pro", Retrieved From: <http://clamcase.com/bluetooth-ipad-keyboard-case.html?PID=6146810> Mar. 28, 2014, 6 Pages.
"MIDTP Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Moko Slim Case with Wakeup Feature for the Google Nexus 7 tablet", article and video retrieved from http://www.youtube.com/watch?v=nZSgbmGuPjs on Oct. 29, 2014, Aug. 8, 2012, 2 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/system-monitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.

(56) References Cited

OTHER PUBLICATIONS

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, Oct. 25, 2013, 12 pages.
"Non-Final Office Action", U.S. Appl. No. 13/228,888, Feb. 10, 2014, 21 pages.
"Non-Final Office Action", U.S. Appl. No. 11/215,052, Jun. 23, 2011, 17 pages.
"Non-Final Office Action", U.S. Appl. No. 11/305,789, Sep. 21, 2009, 5 pages.
"Non-Final Office Action", U.S. Appl. No. 11/502,264, Sep. 30, 2009, 15 pages.
"Non-Final Office Action", U.S. Appl. No. 11/502,264, Sep. 14, 2012, 14 pages.
"Non-Final Office Action", U.S. Appl. No. 12/244,545, Mar. 27, 2012, 18 pages.
"Non-Final Office Action", U.S. Appl. No. 12/244,545, Aug. 17, 2011, 15 pages.
"Non-Final Office Action", U.S. Appl. No. 12/413,977, Jul. 19, 2011, 17 pages.
"Non-Final Office Action", U.S. Appl. No. 12/413,977, Jul. 20, 2012, 18 pages.
"Non-Final Office Action", U.S. Appl. No. 12/414,382, Jul. 26, 2011, 9 pages.
"Non-Final Office Action", U.S. Appl. No. 12/414,434, Jan. 17, 2012, 7 pages.
"Non-Final Office Action", U.S. Appl. No. 12/414,434, May 31, 2012, 7 pages.
"Non-Final Office Action", U.S. Appl. No. 12/414,434, Aug. 2, 2011, 6 pages.
"Non-Final Office Action", U.S. Appl. No. 12/414,455, Aug. 29, 2011, 8 pages.
"Non-Final Office Action", U.S. Appl. No. 12/414,458, Jul. 6, 2011, 8 pages.
"Non-Final Office Action", U.S. Appl. No. 12/414,476, Nov. 9, 2012, 22 pages.
"Non-Final Office Action", U.S. Appl. No. 12/414,476, Aug. 3, 2011, 21 pages.
"Non-Final Office Action", U.S. Appl. No. 12/433,605, Jan. 11, 2013, 7 pages.
"Non-Final Office Action", U.S. Appl. No. 12/433,605, Jun. 24, 2011, 10 pages.
"Non-Final Office Action", U.S. Appl. No. 12/433,667, Jun. 7, 2011, 15 pages.
"Non-Final Office Action", U.S. Appl. No. 12/433,667, Feb. 3, 2012, 16 pages.
"Non-Final Office Action", U.S. Appl. No. 12/469,419, Nov. 9, 2011, 15 pages.
"Non-Final Office Action", U.S. Appl. No. 12/469,419, May 23, 2012, 13 pages.
"Non-Final Office Action", U.S. Appl. No. 12/469,458, May 3, 2013, 21 pages.
"Non-Final Office Action", U.S. Appl. No. 12/469,458, Jul. 1, 2011, 15 pages.
"Non-Final Office Action", U.S. Appl. No. 12/469,458, Sep. 21, 2012, 14 pages.
"Non-Final Office Action", U.S. Appl. No. 12/469,480, Aug. 27, 2013, 22 pages.
"Non-Final Office Action", U.S. Appl. No. 12/469,480, Oct. 17, 2012, 16 pages.
"Non-Final Office Action", U.S. Appl. No. 12/469,480, Sep. 22, 2011, 14 pages.
"Non-Final Office Action", U.S. Appl. No. 12/470,558, Nov. 22, 2011, 9 pages.
"Non-Final Office Action", U.S. Appl. No. 12/480,969, Apr. 4, 2013, 22 pages.
"Non-Final Office Action", U.S. Appl. No. 12/480,969, Aug. 7, 2012, 15 pages.
"Non-Final Office Action", U.S. Appl. No. 12/484,799, Aug. 11, 2011, 12 pages.
"Non-Final Office Action", U.S. Appl. No. 12/484,799, Aug. 7, 2012, 13 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/577,400, Apr. 15, 2013, 25 pages.
"Non-Final Office Action", U.S. Appl. No. 12/577,400, Apr. 11, 2012, 22 pages.
"Non-Final Office Action", U.S. Appl. No. 12/721,422, Oct. 1, 2012, 7 pages.
"Non-Final Office Action", U.S. Appl. No. 12/972,967, Jan. 30, 2013, 19 pages.
"Non-Final Office Action", U.S. Appl. No. 12/977,584, Dec. 7, 2012, 8 pages.
"Non-Final Office Action", U.S. Appl. No. 12/978,184, Jan. 23, 2013, 7 pages.
"Non-Final Office Action", U.S. Appl. No. 12/983,106, Nov. 9, 2012, 17 pages.
"Non-Final Office Action", U.S. Appl. No. 13/073,300, Jul. 25, 2013, 13 pages.
"Non-Final Office Action", U.S. Appl. No. 13/118,181, Mar. 4, 2013, 22 pages.
"Non-Final Office Action", U.S. Appl. No. 13/118,204, Feb. 28, 2013, 13 pages.
"Non-Final Office Action", U.S. Appl. No. 13/118,221, Mar. 1, 2013, 22 pages.
"Non-Final Office Action", U.S. Appl. No. 13/118,257, Mar. 5, 2013, 19 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/196,272, Feb. 6, 2013, 10 pages.
"Non-Final Office Action", U.S. Appl. No. 13/196,272, Sep. 3, 2013, 5 pages.
"Non-Final Office Action", U.S. Appl. No. 13/224,258, Jan. 8, 2013, 35 pages.
"Non-Final Office Action", U.S. Appl. No. 13/228,876, Nov. 22, 2013, 14 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,155, Nov. 18, 2013, 14 pages.
"Non-Final Office Action", U.S. Appl. No. 13/229,556, Mar. 28, 2014, 12 pages.
"Non-Final Office Action", U.S. Appl. No. 13/229,693, Mar. 12, 2013, 21 pages.
"Non-Final Office Action", U.S. Appl. No. 13/229,709, Apr. 7, 2014, 12 pages.
"Non-Final Office Action", U.S. Appl. No. 13/335,001, Sep. 13, 2013, 15 pages.
"Non-Final Office Action", U.S. Appl. No. 13/335,001, Jan. 8, 2014, 17 pages.
"Non-Final Office Action", U.S. Appl. No. 13/345,383, Feb. 28, 2013, 25 pages.

(56) References Cited

OTHER PUBLICATIONS

"Non-Final Office Action", U.S. Appl. No. 13/492,495, Dec. 19, 2012, 6 pages.
"Non-Final Office Action", U.S. Appl. No. 13/492,495, Sep. 17, 2012, 8 pages.
"Non-Final Office Action", U.S. Appl. No. 13/655,386, Dec. 26, 2012, 23 pages.
"Non-Final Office Action", U.S. Appl. No. 13/655,390, Dec. 17, 2012, 12 pages.
"Non-Final Office Action", U.S. Appl. No. 13/656,354, Feb. 6, 2013, 10 pages.
"Non-Final Office Action", U.S. Appl. No. 13/656,574, Jan. 31, 2013, 21 pages.
"Non-Final Office Action", U.S. Appl. No. 13/656,639, Feb. 7, 2013, 29 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/657,789, Jan. 9, 2013, 38 pages.
"Non-Final Office Action", U.S. Appl. No. 13/658,694, Feb. 13, 2014, 19 pages.
"Non-Final Office Action", U.S. Appl. No. 13/658,694, Apr. 26, 2013, 13 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/433,667, Jun. 25, 2013, 14 pages.
"Notice of Allowance", U.S. Appl. No. 12/469,419, Nov. 27, 2012, 13 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/721,422, Jul. 11, 2013, 9 pages.
"Notice of Allowance", U.S. Appl. No. 12/977,584, Jun. 19, 2013, 5 pages.
"Notice of Allowance", U.S. Appl. No. 12/978,184, Nov. 6, 2013, 5 pages.
"Notice of Allowance", U.S. Appl. No. 12/978,184, Aug. 2, 2013, 5 pages.
"Notice of Allowance", U.S. Appl. No. 13/196,272, Nov. 8, 2013, 8 pages.
"Notice of Allowance", U.S. Appl. No. 13/492,495, Apr. 26, 2013, 5 pages.
"Notice of Allowance", U.S. Appl. No. 13/655,386, Apr. 25, 2014, 6 pages.
"Notice of Allowance", U.S. Appl. No. 13/655,390, May 24, 2013, 5 pages.
"Notice of Allowance", U.S. Appl. No. 13/656,639, Aug. 19, 2013, 14 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYXGraphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6. 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, Mar. 2014, 9 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QNX Photon microGUI Windowing System", Retrieved from: <http://www.qnx.com/developers/docs/6.5.0/index.jsp?topic=%2Fcom.qnx.doc.photon_prog_guide%2Fdragndrop.html> on Apr. 6, 2014, 22 pages.
"QODE Ultimate Keyboard Case for iPad (4th & 3rd gen) and iPad 2", Available at: <http://www.belkin.com/us/p/P-F5L149/>, Mar. 28, 2013, 8 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Restriction Requirement", U.S. Appl. No. 13/658,694, Feb. 6, 2013, 6 pages.
"SAVFY® Google Nexus 7 Flip Stand Leather Folio Case Cover Multi-Function Smart Cover with Magnetic Auto Sleep and Wake up Sensor, Free Bonus: Clear Screen Protector + SAVFY Cleaning Cloth for Google Nexus 7 Asus Tablet Android 4.1 Jellybean 8GB / 16GB/32GB", retrieved from http://www.amazon.co.uk/SAVFY®-Google-Leather-Multi-Function-Magnetic/dp/B00F36H4AK on Oct. 29, 2014, 4 pages.
"SecureMe-Anti-Theft Security Application S60 3rd", Retrieved from: <http://www.killermobile.com/newsite/mobiled-software/s60-applications/secureme-%11-anti%11theft-security-application-for-s60-3rd.htm>on Jun. 28, 2011, Dec. 15, 2008, 3 pages.
"Snap", Windows 7 Features—retrieved from <http://windows.microsoft.com/en-US/windows7/products/features/snap> on Sep. 23, 2011, 2 pages.
"Supplemental Notice of Allowance", U.S. Appl. No. 12/433,667, Aug. 1, 2013, 2 pages.
"Supplemental Notice of Allowance", U.S. Appl. No. 12/977,584, Sep. 16, 2013, 2 pages.

(56) References Cited

OTHER PUBLICATIONS

"Supplemental Notice of Allowance", U.S. Appl. No. 12/977,584, Oct. 11, 2013, 2 pages.
"Supplemental Notice of Allowance", U.S. Appl. No. 12/987,184, Feb. 25, 2014, 2 pages.
"Supplemental Notice of Allowance", U.S. Appl. No. 13/655,390, Sep. 19, 2013, 2 pages.
"Supplemental Notice of Allowance", U.S. Appl. No. 13/655,390, Jul. 25, 2013, 2 pages.
"Supplemental European Search Report", EP Application No. 10823883.3, Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on Mat 5, 2009., Jan. 2009, 51 Pages.
"TaskOS", AppBrain retrieved from <http://www.appbrain.com/app/taskos/com.profete162.TaskOS> on Nov. 18, 211, 2 pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"USRobotics Adds 360° Rotating Folio Case/Stand for the iPad 2 to Tablet Accessory Product Portfolio", retrieved from http://usr-lat.com/press/pr-press-release.asp?loc=mxco&prid=679 on Oct. 29, 2014, Jul. 12, 2011, 2 pages.
"What's new in Excel 2013", Retrieved From: <http://office.microsoft.com/en-in/excel-help/what-s-new-in-excel-2013-HA102809308.aspx> Mar. 28, 2014, Oct. 30, 2012, 5 Pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/window s_phone_7_live_tiles.html> on May 11, 2011, Oct. 20, 2010, 3 pages.
"Winterface Review", Retrieved from: <http://www.mytodayscreen.com/winterfacereview/> on Nov. 12, 2008, Jul. 9, 2008, 42 pages.
"Wireless Bluetooth Mobile Keyboard", Retrieved From: <http://www.verbatim.com/prod/accessories/keyboards/wireless-mobile-keyboard/ > Apr. 14, 2014, Jan. 12, 2011, 1 Page.
"Womma", Retrieved from: <http://www.womma.org/blog/links/wom-trends/> on May 5, 2009., 2007, 70 Pages.
"Working with Multiple Windows", MSOffice tutorial!—retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"Yui 3: ScrollView [beta]", Retrieved from: <http://developer.yahoo.com/yui/3/scrollview/> on Sep. 28, 2010, 5 pages.
"ZAGGkeys PROfolio+ Keyboard", Retrieved From: <http://www.zagg.com/accessories/zaggkeys-ipad-profolio-plus-keyboardcase/7063?cj_aid=10539646&cj_pid=6146810&cj_sid=fwn62 ieocicw#7063?cj_aid=10539646&cj_pid=6146810&cj_sid=fwn62ieocicw&_suid=13959948728450884 1408342879342> Mar. 31, 2014, 2013, 9 pages.
Aguilar, "How to Run Multiple Instances of the Same App in Mac OS X", Retrieved from <http://operating-systems.wonderhowto.com/how-to/run-multiple-instances-sameapp-mac-os-x-0140144/> on Feb. 20, 2013, Jan. 1, 2013, 4 Pages.
Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Bawjea, "OpenHeatMap: Create Heat Maps for Excel Spreadsheets With Geo Data", Retrieved From: <http://www.makeuseof.com/tag/openheatmap-create-heat-maps/> Mar. 29, 2014, Jul. 24, 2010, 4 Pages.
Beiber, et al.,' "Screen Coverage: A Pen-Interaction Problem for PDA's and Touch Screen Computers", In Proceedings of ICWMC 2007, Mar. 2007, 6 pages.
Bhatnagar, "Locate and Kill Annoying Processes in Windows", Trouble Fixers: All About Fixing Computer Troubles—retrieved from <http://www.troublefixers.com/locate-and-kill-annoying-processes-in-windows/> on Nov. 18, 2011, Apr. 19, 2010, 4 pages.
Bjork, et al.,' "Redefining the Focus and Context of Focus+Context Visualizations", In Proceedings of INFOVIS 2000—Available at <http://www.johan.redstrom.se/papers/redefining.pdf>, Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bolton, "A Slide-out Keyboard on an Android tablet. Genius or total madness?", Retrieved From: <http://www.techradar.com/reviews/pc-mac/tablets/asus-eee-pad-slider-1036296/review> Mar. 31, 2014, Oct. 25, 2011, 8 pages.
Bowes, et al.,' "Transparency for Item Highlighting", Faculty of Computing Science, Dalhousie University—Available at <http://torch.cs.dal.ca/~dearman/pubs/G12003-bowes,dearman,perkins-paper.pdf>, 2003, 2 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>,Sep. 2006, pp. 829-836.
Carrera, et al.,' "Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley "How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen, et al.,' "Automatic Strategies in the Siemens RTL Tiled Window Manager", In Proceedings: The 2nd IEEE Conference on Computer Workstations, Mar. 7, 1988, pp. 111-119.

(56) References Cited

OTHER PUBLICATIONS

Cohen, et al.,' "Wang Tiles for Image and Texture Generation", In Proceedings of SIGGRAPH 2003—Available <http://research.microsoft.com/en-us/um/people/cohen/WangFinal.pdf>, 2003, 8 pages.

Crouch, "Smartphone Wars: Micron's Slide-to-Unlock Patent", Jan. 30, 2013, 2 pages.

Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.

Danish, "Win7sé Brings Mac-Like Screen Corners to Windows 7 & Windows 8", retrieved from <http://technomondo.com/2011/11/13/win7se-brings-mac-like-screencorners-to-windows-7-windows8/> on Nov. 23, 2011, Nov. 13, 2011, 4 pages.

Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.

Delimarsky, "Sending Tile Push Notifications on Windows Phone 7", retrieved from <http://mobile.dzone.com/articles/sending-tile-push> on May 10, 2011, Aug. 25, 2010, 2 pages.

Denoue, et al.,' "WebNC: Efficient Sharing of Web Applications", In Proceedings of WWW 2009—Available at <http://www.fxpal.com/publications/FXPAL-PR-09-495.pdf>, 2009, 2 pages.

Dixon, "Living in the Online Cloud: The T-Mobile G1 / Google Android Smartphone", Retrieved from <http://www.manifest-tech.com/media_pda/t-mobile_g1_android.htm>, Dec. 2008, 3 pages.

Dolcourt, "Webware", Retrieved from: <http://news.cnet.com/webware/?categoryId=2010> on May 5, 2009., May 5, 2009, 13 Pages.

Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.

Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.

Farrugia, et al.,' "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.

Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.

Friedlaender, "Better Way to Delete and Close Apps from Task Manager", retrieved from <http://www.ideasproject.com/ideas/14475> on Nov. 21, 2011, Nov. 15, 2011, 2 pages.

Gade, "Samsung Alias u740", Retrieved from: <http://www.mobiletechreview.com/phones/Samsung-U740.htm> on Nov. 20, 2008, Mar. 14, 2007, 6 pages.

Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.

Gasior, "MST's Win8 Tablet Hides Slide-Out Keyboard", Retrieved From: <http://techreport.com/news/23060/msi-win8-tablet-hides-slide-out-keyboard > Apr. 14, 2014, Jun. 7, 2012, 2 Pages.

Gralla, "Windows XP Hacks, Chapter 13—Hardware Hacks", O'Reilly Publishing, Feb. 23, 2005, 25 pages.

Greenberg, "Review: Sharkk Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, Jan. 25, 2014, 6 Pages.

Ha, et al.,' "Simkeys: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.

Hahn, "Freedom Case, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.

Harrison, "Symbian OS C++ for Mobile Phones vol. 3", Retrieved from: <http://www.amazon.co.uk/Symbian-OS-Mobile-PhonesPress/dp/productdescription/0470066415> on Oct. 23, 2008, Symbian Press,Jun. 16, 2003, 4 pages.

Hickey, "Google Android has Landed; T-Mobile, HTC Unveil G1", Retrieved from: <http://www.crn.com/retail/210603348> on Nov. 26, 2008., Sep. 23, 2008, 4 pages.

Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.

Janecek, et al.,' "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf >, Feb. 15, 2005, pp. 1-15.

Jason, "Oyster Ergonomic Keyboard Review", Retrieved from <http://allthingsergo.com/blog/reviews/oyster-ergonomic-keyboard-review/> on Oct. 31, 2014, Oct. 16, 2014, 4 pages.

Kandogan, et al.,' "Elastic Windows: Improved Spatial Layout and Rapid Multiple Window Operations", In Proceedings of the Workshop on Advanced Visual Interfaces, May 27, 1996, 10 Pages.

Kcholi, "Windows CE .NET Interprocess Communication", Retrieved from http://msdn.microsoft.com/en-us/library/ms836784.aspx on Jul. 17, 2008., Jan. 2004, 15 Pages.

Kendrick, "Belkin Ultimate Keyboard Case for iPad: It's the magnets (review)", retrieved from http://www.zdnet.com/belkin-ultimate-keyboard-case-for-ipad-its-the-magnets-review-7000013164/ on Oct. 29, 2014, Mar. 27, 2013, 7 pages.

Keranen "OpenGL-based User Interface Toolkit for Symbian Mobile Devices", Master of Science Thesis, Tamere University of Technology, Department of Information Technology, Apr. 6, 2005, 88 pages.

Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.

Kurdi, "WinSplit Revolution", Retrieved from <http://www.freewaregenius.com/winsplit-revolution/> on Jun. 30, 2013, Aug. 22, 2007, 4 Pages.

La, "Parallax Gallery", Available at <http://webdesignerwall.comtutorials/parallax-gallery/comment-page-1>, Apr. 25, 2008, 16 pages.

Livingston, et al.,' "Windows 95 Secrets", 1995, I DG Books Worldwide, 3rd Edition, 1995, pp. 121-127.

Long, "Gmail Manager 0.6", Retrieved from: <https://addons.mozilla.org/en-US/firefox/addon/1320/> on Sep. 29, 2010, Jan. 27, 2010, 4 pages.

Mann, et al.,' "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia, "Multitasking: What Does It Mean?", retrieved from <http://mantia.me/blog/multitasking/> on Sep. 23, 2011, 3 pages.

Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

Marie, "MacBook Trackpad Four Fingers Swipe Left/Right to Switch Applications", MacBook Junkie—retrieved from <http://www.macbookjunkie.com/macbook-trackpadfour-fingers-swipe-left-right-to-switch-applications/> on May 11, 2011, Nov. 13, 2010, 4 pages.

Mastin, "Lenovo Miix 10 Review: A Good Tablet With an (Optional) Killer Keyboard", Retrieved From: <http://www.pcworld.com/article/2060784/lenovo-miix-10-review-a-good-tablet-with-an-optional-killer-keyboard.html> Apr. 14, 2014, Nov. 5, 2013, 5 Pages.

(56) References Cited

OTHER PUBLICATIONS

Matejka, et al.,' "Patina: Dynamic Heatmaps for Visualizing Application Usage", In Proceedings: The SIGCHI Conference on Human Factors in Computing Systems, Autodesk Research, Toronto, Ontario, Canada,Apr. 27, 2013, pp. 3227-3236.
Mazo, "How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.
Mei, et al.,' "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Michaluk "Using the Application Switcher and Closing Apps When Finished to Maximize your BlackBerry Efficiency", Retrieved from <http://crackberry.com/using-application-switcher-and-closing-apps-when-finished-maximize-your-blackberry- efficiency> on Feb. 19, 2013, Aug. 17, 2009, 14 pages.
Mpdooley"SeaMonkey Hangs during Drag Operation", mozilaZine—retrieved from <http://forums.mozillazine.org/viewtopic.php?f=5&t=1783735> on Nov. 18, 2011, Mar. 5, 2010, 2 pages.
Nguyen, et al.,' "BendID: flexible interface for localized deformation recognition", In Proceedings of the ACM international Joint Conference on Pervasive and Ubiquitous Computing, Sep. 13, 2014, pp. 553-557.
Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.
Perry, "Teach Yourself Windows 95 in 24 Hours", 1997, Sams Publishing, 2nd Edition, 1997, pp. 193-198.
Raghaven, et al.,' "Model Based Estimation and Verification of Mobile Device Performance", Available at http://alumni.cs.ucsb.edu/~raimisl/emsoft04_12.pdf., Sep. 27-29, 2004, 10 Pages.
Rathbone, "Windows Phone 7 Live Tile Schedules—How to Execute Instant Live Tile Updates", Retrieved from <http://www.diaryofaninja.com/blog/2011/04/03/windowsphone-7-live-tile-schedules-ndash-executing-instant-live-tile-updates> on Mar. 11, 2013, Apr. 3, 2011, 8 pages.
Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.

Rice, et al.,' "A System for Searching Sound Palettes", Proceedings of the Eleventh Biennial Symposium on Arts and Technology Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.
Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.
Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf >,2004, 18 pages.
Simeone, "A Cross-Device Drag-and-Drop Technique", in Proceedings of MUM 2013, Dec. 2013, 4 pages.
Singh, et al.,' "CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 pages.
Smith, et al.,' "GroupBar: The TaskBar Evolved", Proceedings of OZCHI 2003—Available at <http://research.microsoft.com/pubs/64316/ozchi2003-groupbar.pdf>, Nov. 2003, pp. 1-10.
Spradlin, "Switcher Provides an Incredible Gesture-based App Switching Tool", Retrieved from <http://www.androidpolice.com/2012/07/09/switcher-proof-of-concept- hits-the-play-store-providing-an-incredible-gesture-based-app-switching-tool/> on Feb. 18, 2013, Jul. 9, 2012, 7 pages.
Stark, "Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.
Stebih, "Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.
Steinicke, et al.,' "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppdworkshop.-pdf.>,Jun. 15, 2008, 4 Pages.
Sun, "Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.
Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra"Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.
Ueland, "25 Apps for Dropbox", Retrieved from: <http://www.practicalecommerce.com/articles/3984-25-Apps-for-Dropbox> on Apr. 6, 2014, Apr. 15, 2013, 10 pages.
Vallerio, et al.,' "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.
Viticci, "Growl 1.3 to Be Released on Mac App Store, Introduce Lion Support and Drop GrowlMail Support", Retrieved from: <http://www.macstories.net/stories/growl-1-3-to-be-released-on-

(56) References Cited

OTHER PUBLICATIONS mac-app-store-introduce-lion-support-and-drop-growlmail-support/> on Jul. 22, 2011, Jul. 6, 2011, 6 pages.
Vornberger, "Bluetile", Retrieved from: <http://www.bluetile.org> on Sep. 29, 2010, 5 pages.
Webster, "VsNotepad: An Improved Way to Jot Down on Windows Mobile", Retrieved from <http://pocketnow.com/index.php/index.php?a=portal_detail&t=news&id=7424>, May 19, 2009, 2 pages.
Wells, "Advanced Task Killer", Android Tapp: Android App Reviews—retrieved from <http://www.androidtapp.com/advanced-task-killer/> on Nov. 18, 2011, Aug. 28, 2009, 15 pages.
Wilson, "How the iPhone Works", Retrieved from: <http://electronics.howstuffworks.com/iphone2.htm> on Apr. 24, 2009, Jan. 2007, 9 pages.
Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock, et al.,' "User-Defined Gestures for Surface Computing", CHI 2009, Apr. 4-9, 2009, Boston, MA—available at <http://faculty.washington.edu/wobbrock/pubs/chi09.2.pdf>, Apr. 4, 2009, 10 pages.
Wollman, "Sony gives the slider another shot with the VAIO Duo 13", Retrieved From: <http://www.engadget.com/2013/06/04/sony-duo-13/> Mar. 31, 2014, Jun. 4, 2013, 7 Pages.
Wu, et al.,' "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt, "/Flash/the art of parallax scrolling", .net Magazine, Aug. 1, 2007, pp. 74-76.
Yang, et al.,' "Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.
Yang, et al.,' "Semantic Photo Album Based on MPEG-4 Compatible Application Format", Retrieved from: <http://ieeexplore.ieee.org/stamp/stamp.jsp?arnumber=04146254.>, 2007, 2 Pages.
"International Search Report and Written Opinion", Application No. PCT/CN2014/089867, Jun. 26, 2015, 15 pages.
"International Search Report and Written Opinion", Application No. PCT/CN2014/089868, Aug. 3, 2015, 11 pages.
"Non-Final Office Action", U.S. Appl. No. 14/516,294, Oct. 29, 2015, 14 pages.
"Non-Final Office Action", U.S. Appl. No. 14/517,379, Oct. 7, 2015, 16 pages.
"Final Office Action", U.S. Appl. No. 14/516,294, May 9, 2016, 15 pages.
"Final Office Action", U.S. Appl. No. 14/517,379, May 19, 2016, 18 pages.
"Non-Final Office Action", U.S. Appl. No. 14/516,228, Jun. 2, 2016, 9 pages.
"Non-Final Office Action", U.S. Appl. No. 14/517,332, Apr. 15, 2016, 13 pages.
"Corrected Notice of Allowance", U.S. Appl. No. 14/516,228, Aug. 23, 2016, 2 pages.
"Corrected Notice of Allowance", U.S. Appl. No. 14/517,332, Nov. 1, 2016, 2 pages.
"Ex Parte Quayle Action", U.S. Appl. No. 14/517,332, Jul. 8, 2016, 6 pages.
"Non-Final Office Action", U.S. Appl. No. 14/425,547, Sep. 8, 2016, 16 pages.
"Non-Final Office Action", U.S. Appl. No. 14/516,294, Jul. 5, 2016, 18 pages.
"Non-Final Office Action", U.S. Appl. No. 14/517,379, Oct. 4, 2016, 11 pages.
"Notice of Allowance", U.S. Appl. No. 14/516,228, Jul. 15, 2016, 8 pages.
"Notice of Allowance", U.S. Appl. No. 14/517,332, Aug. 23, 2016, 7 pages.
"Final Office Action", U.S. Appl. No. 14/516,294, Jan. 5, 2017, 20 pages.
"Non-Final Office Action", U.S. Appl. No. 14/517,216, Dec. 14, 2016, 23 pages.
"Non-Final Office Action", U.S. Appl. No. 14/517,265, Jan. 11, 2017, 16 pages.
"Non-Final Office Action", U.S. Appl. No. 14/517,298, Nov. 15, 2016, 50 pages.
"Notice of Allowance", U.S. Appl. No. 14/522,857, Dec. 9, 2016, 9 pages.
"Extended European Search Report", EP Application No. 14888856.3, Feb. 9, 2017, 4 pages.
"Final Office Action", U.S. Appl. No. 14/425,547, Apr. 20, 2017, 19 pages.
"Foreign Office Action", EP Application No. 14888804.3, Apr. 11, 2017, 8 pages.
"Foreign Office Action", EP Application No. 14888856.3, Mar. 6, 2017, 5 pages.
"Foreign Office Action", EP Application No. 14888899.3, Apr. 11, 2017, 6 pages.
"Non-Final Office Action", U.S. Appl. No. 14/522,857, Mar. 17, 2017, 17 pages.
"Notice of Allowance", U.S. Appl. No. 14/516,294, Mar. 27, 2017, 5 pages.
"Supplementary European Search Report", EP Application No. 14888678.1, Apr. 4, 2017, 4 pages.
"Supplementary European Search Report", EP Application No. 14888804.3, Mar. 21, 2017, 4 pages.
"Supplementary European Search Report", EP Application No. 14888899.3, Mar. 22, 2017, 5 pages.

\* cited by examiner

MULTI-CONFIGURATION INPUT DEVICE

PRIORITY APPLICATION

This application claims benefit of priority of PCT Application Serial No. PCT/CN2014/089867 entitled "Multi-Configuration Input Device" filed Oct. 30, 2014, the content of which is incorporated by reference herein in its entirety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
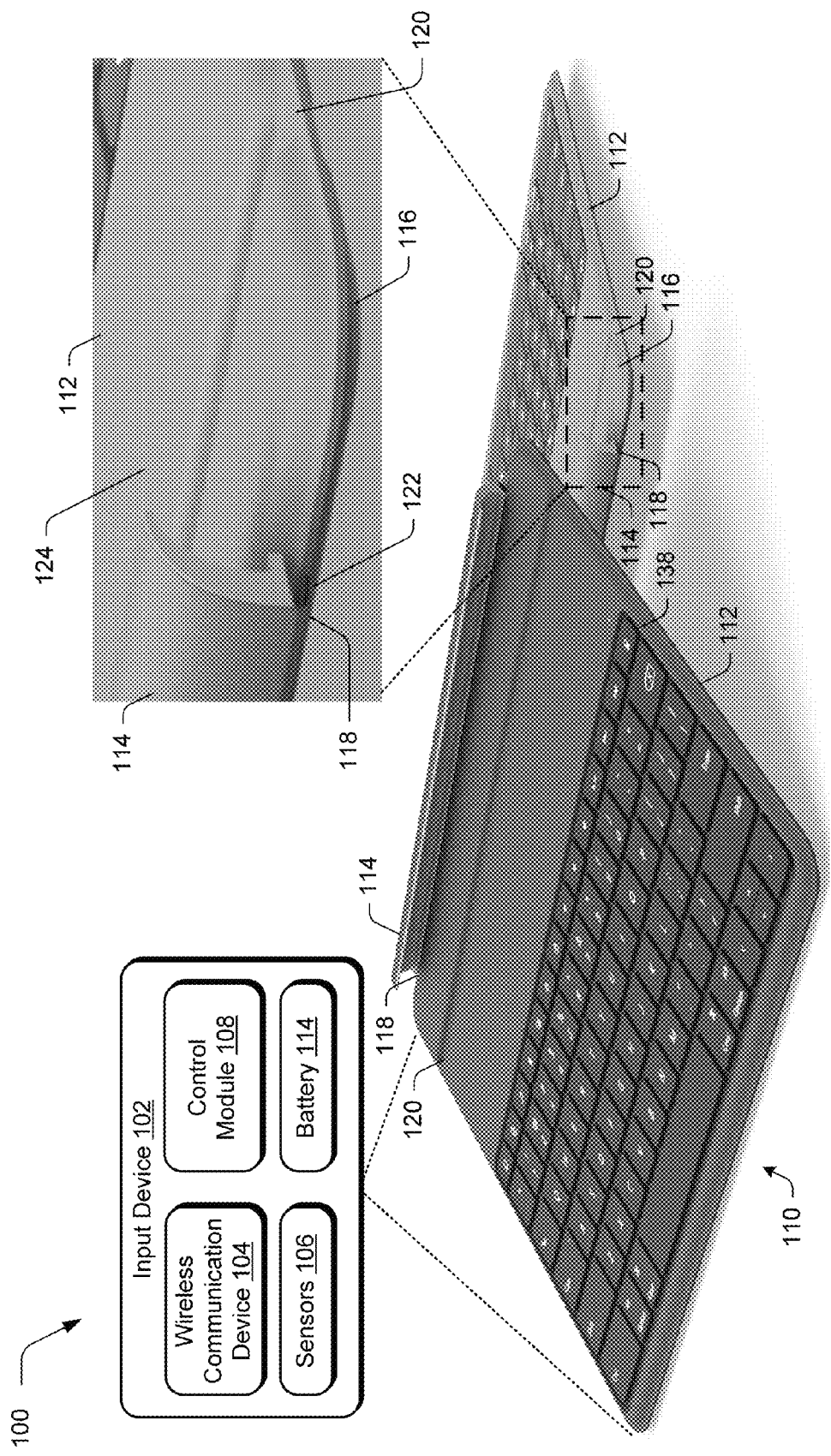
FIG. 1 is an illustration of an environment in an example implementation showing a multi-configuration input device.

Mobile computing devices have been developed to increase the functionality that is made available to users in a mobile setting. For example, a user may interact with a mobile phone, tablet computer, or other mobile computing device communicate in telephone or teleconference calls, to check email, surf the web, compose texts, interact with applications, listen to music, play games, and so on.

Because mobile computing devices are configured to be mobile, however, conventional techniques that are utilized to interact with the mobile computing device may be limited by the mobile configuration. For example, an onscreen keyboard may be useful to enter limited amounts of text but is not well suited for intensive data entry interactions. Further, display of the onscreen keyboard may consume significant amounts of an available display area of a display device of the mobile computing device, which may further limit usefulness of these conventional techniques. Conventional input techniques for mobile computing devices may be limited in a variety of ways, such as difficulty in text entry, consumption of valuable display area on a display device that may already be limited due to a mobile form factor, and so on.

A multi-configuration input device is described. In one or more implementations, the input device includes a connection portion configured to be magnetically secured to a mobile computing device, such as a mobile phone, tablet, and so on. The input device also includes an input portion having sensors (e.g., capacitive sensors, mechanical keys, pressure-sensitive sensors) that are usable to provide inputs to the mobile computing device using a wireless communication device, e.g., via Bluetooth®.

The input portion is connected to the connection portion using a support portion. The support portion, for instance, may be configured to support rotational movement in relation to the connection portion and also support rotational movement in relation to the input portion, e.g., using a flexible hinge formed from a fabric or other flexible materials. This may be utilized to place the input device in a variety of different configurations in relation to the mobile computing device without detaching and reconnecting the connection portion from the mobile computing device, such as a cover configuration, a stand configuration (e.g., to support typing via the input portion), a viewing configuration in which the input portion is not accessible to accept inputs, and so on. Additionally, a wireless communication device may be included to support connection with a variety of different operating systems. A variety of other functionality may also be supported, such as to detect when the input device is not accessible to receive user inputs and therefore disable the wireless communication device. Further discussion of these and other examples may be found in relation to the following section.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 having different perspective views of an input device 102. The input device 102 in this example is configured as a keyboard that is configured to provide inputs to initiate operations of a mobile computing device, such as a mobile phone, tablet computer, portable gaming device, music player, wearable device, home appliance, and so on.

The input device 102 in this example is illustrated as including a wireless communication device 104 that is configured to communicate inputs from the input device 102 to the mobile computing device. The wireless communication device 104 may also support wireless communication from the mobile computing device to the input device 102. A variety of different wireless communication techniques may be employed by the wireless communication device 104, such as near field communication (NFC), Wi-Fi, Bluetooth®, cellular protocols (e.g., LTE), and so on.

The input device 102 is also illustrated as including sensors 106, which may be utilized to support a variety of different functionality. The sensors 106, for instance, may be utilized to detect when the input device 102 is in different configurations. This may then be leveraged by a control module 108 to disable the wireless communication device 104 for configurations in which inputs are not to be received via sensors 110 (e.g., keys) of an input portion 112 are not accessible. Disabling the wireless communications device 104 and/or the electronics that detect keystrokes when the when the device is in a closed configuration may conserve battery 114 power. The battery 114 may be charged in a variety of ways, such as a plug-in connection (e.g., micro USB®), induction, and so forth.

The sensors 110 of the input portion 112 are configured to support user interaction to generate inputs that are usable to initiate one or more operations of the mobile computing device. The sensors 110 may be configured in a variety of ways, such as mechanical sensors (e.g., keys) as illustrated, pressure-sensitive keys (e.g., membrane switches using a force sensitive ink), capacitive sensors (e.g., to detect gestures, a trackpad), optical sensors, resistive sensors, ultrasonic sensors, and so forth. The sensors 110 may include any type of sensor that may detect user input. Haptic feedback components may be integrated with the sensors 110 or may be located proximate to sensors 110 to provide haptic feedback response to user input. For example, piezoelectric diaphragms may be used to provide haptic feedback response.

The input device 102 includes sensor 138, which in the case depicted in FIG. 1 is a key. Sensor 138 is an operating system selector key that may select among multiple operating systems. Alternatively, multiple sensors or keys may each have individual associations with a different operating system. For example, input device 102 may have a key for "iOS," "Android," or "Windows." An indicator light behind or proximate to the keys may indicate which operating system is selected. When the operating system selection function is implemented with one sensor or key, serial actuations of the sensor or key may serially select among the operating systems. An indicator light behind an operating system designation may light up as the selection switches from operating system to operating system. This feature advantageously permits the user to use input device 102 with multiple devices using multiple operating systems. The selection mechanism may be necessary because different operating systems are operable with different keyboard and input device configurations.

The input device 102 also includes a connection portion 114 that is configured to be secured to a mobile computing device and removed from the mobile computing device by one or more hands of a user without using tools. The connection portion 114, for instance, may be configured to be secured to the mobile computing device using magnetism, e.g., by inclusion of magnets on the connection portion 114, the mobile computing device, or both. The magnets, for instance, may be configured to implement a flux fountain in which an arrangement of magnets is used to steer a magnetic flux field of the magnets "outward" away from the connection portion 114 to increase a securing force of the magnets. In the illustrated example, the connection portion 114 is configured to form a complementary shape of a housing of a mobile computing device to which the connection portion 114 is to be secured, which is a concave shape of the connection portion 114 in the illustrated example. Alternatively, the connection portion 114 may utilize mechanical detents, hooks, latches, fangs, or other mechanisms to facilitate attachment of a computing device.

The input device 102 also includes a support portion 116. The support portion 116 is rotationally connected to the connection portion 114 and is also rotationally connection to the input potion 112. For example, the connection portion 114 may be rotated almost 360 degrees in relation to the support portion 118. Likewise, the input portion may also be rotated almost 360 degrees in relation to the support portion 116.

Rotation may be implemented in a variety of different ways, such as through rotation of a pin. In the illustrated example, a flexible hinge 118 is employed to secure the connection portion 114 to the support portion 116. Another flexible hinge 120 is employed to secure the support portion 116 to the input portion 112.

Flexible hinges 118, 120 may also be implemented in a variety of ways. For example, the flexible hinges 118, 120 may be formed from a rubber-like material that permits flexing of the material to support the rotational movement. In the illustrated example, the flexible hinges 118, 120 are formed from one or more layers of fabric, e.g., as a laminate structure.

Flexible hinge 120, for instance, may be formed from first and second outer layers 122, 124 of fabric. The first and second outer layers 122, 124 of fabric may be laminated together, along with a support layer disposed between (e.g., of Mylar), to form the flexible hinge 120 that secures the support portion 116 to the input portion 112.

Flexible hinge 118 may also be formed from both the first and second outer layers 122, 124. In another example, the second outer layer 124 of fabric that forms an outer surface of a rear (i.e., back) of the input device 102 may extend across a rear of the input portion 112, form part of flexible hinge 120, a rear of the support portion 116, form flexible hinge 122, and is secured to the connection portion 114 (e.g., using an adhesive) to form an outer surface of the connection portion 114. In this way, a continuous outer surface may be provided thereby supporting improved user interaction and reduction in contamination that may enter an interior of the input device.

Likewise, the first outer layer 122 of fabric may form an outer surface of a front part of the input device 102 that includes the sensors 110, e.g., keys of the keyboard. The first outer layer 122, for instance, may form an outer layer of the sensors in a pressure-sensitive key configuration, may include an opening through which mechanical keys may be exposed as illustrated, and so on. The first outer layer 122 may thus form at least a part of an outer surface of the input portion 112, form part of flexible hinge 120, a rear of the support portion 116, form flexible hinge 122, and is secured to the connection portion 114, e.g., using an adhesive. Thus, a continuous outer surface may also be provided for a front side of the input device 102 thereby supporting improved user interaction and reduction in contamination that may enter an interior of the input device.

Figure 3:
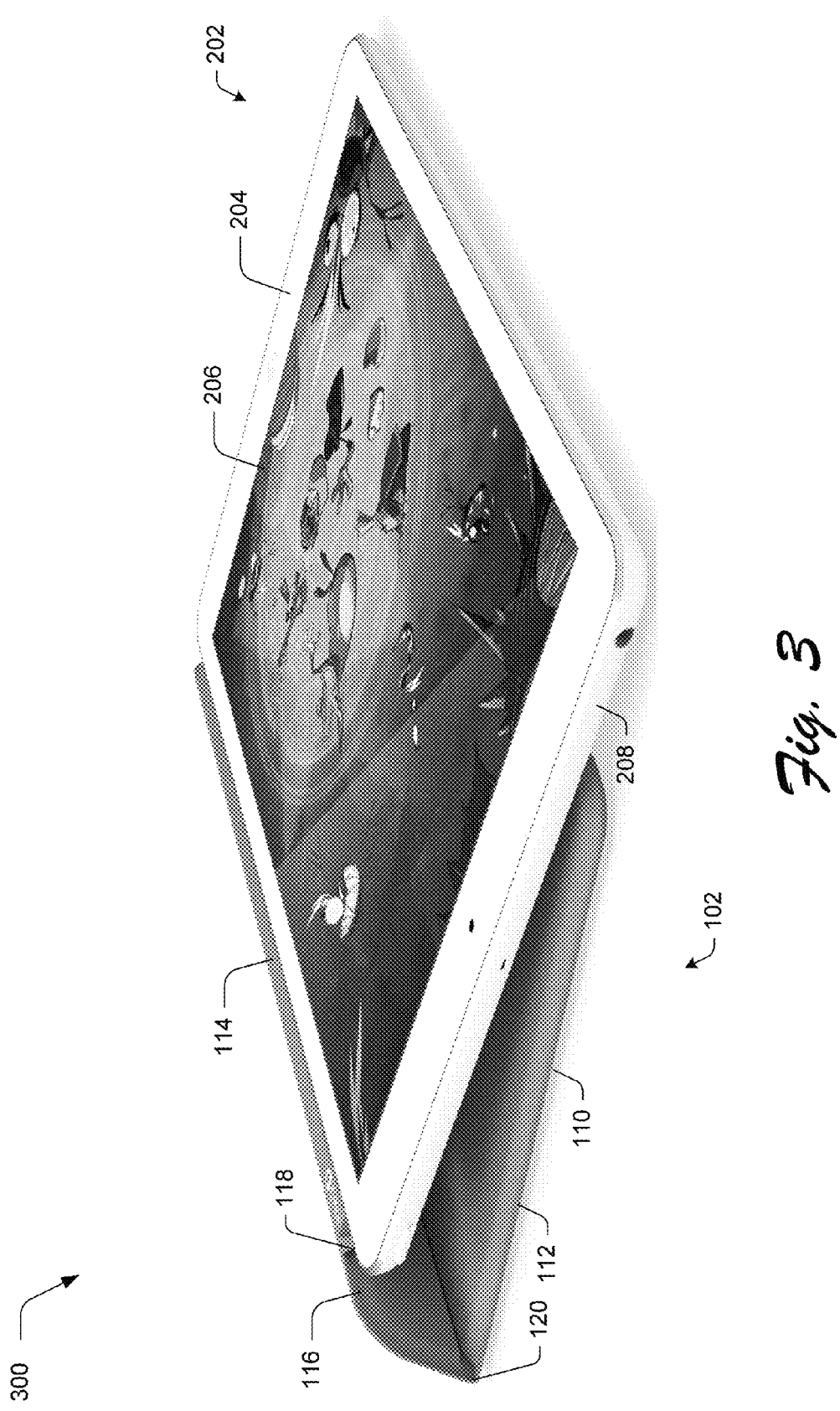
FIG. 3 depicts an example implementation showing the input device of FIG. 1 as assuming a viewing configuration in relation to a mobile computing device.
Figure 4:
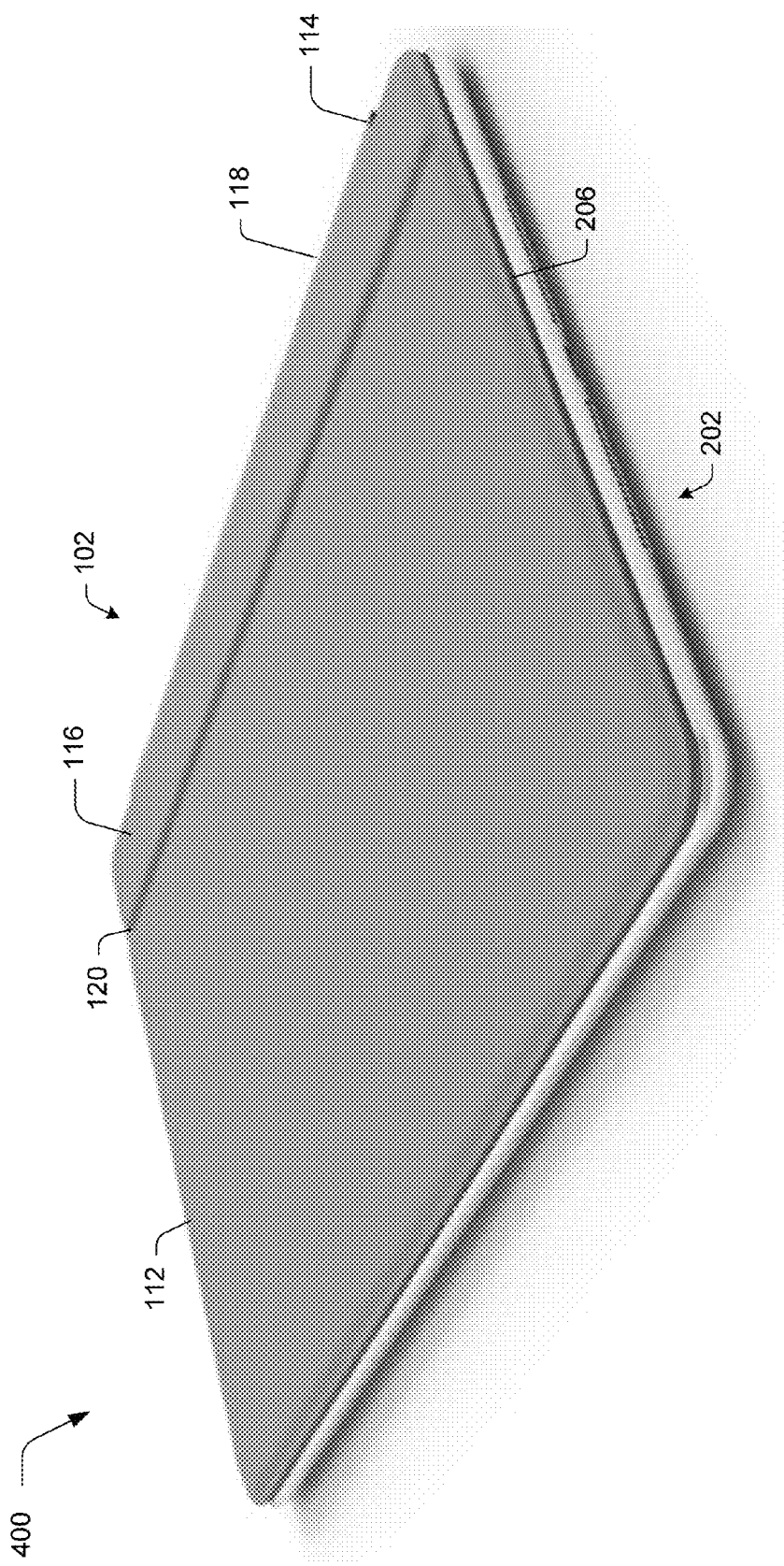
FIG. 4 depicts an example implementation showing the input device of FIG. 1 as assuming a closed configuration in relation to a mobile computing device.
Figure 5:
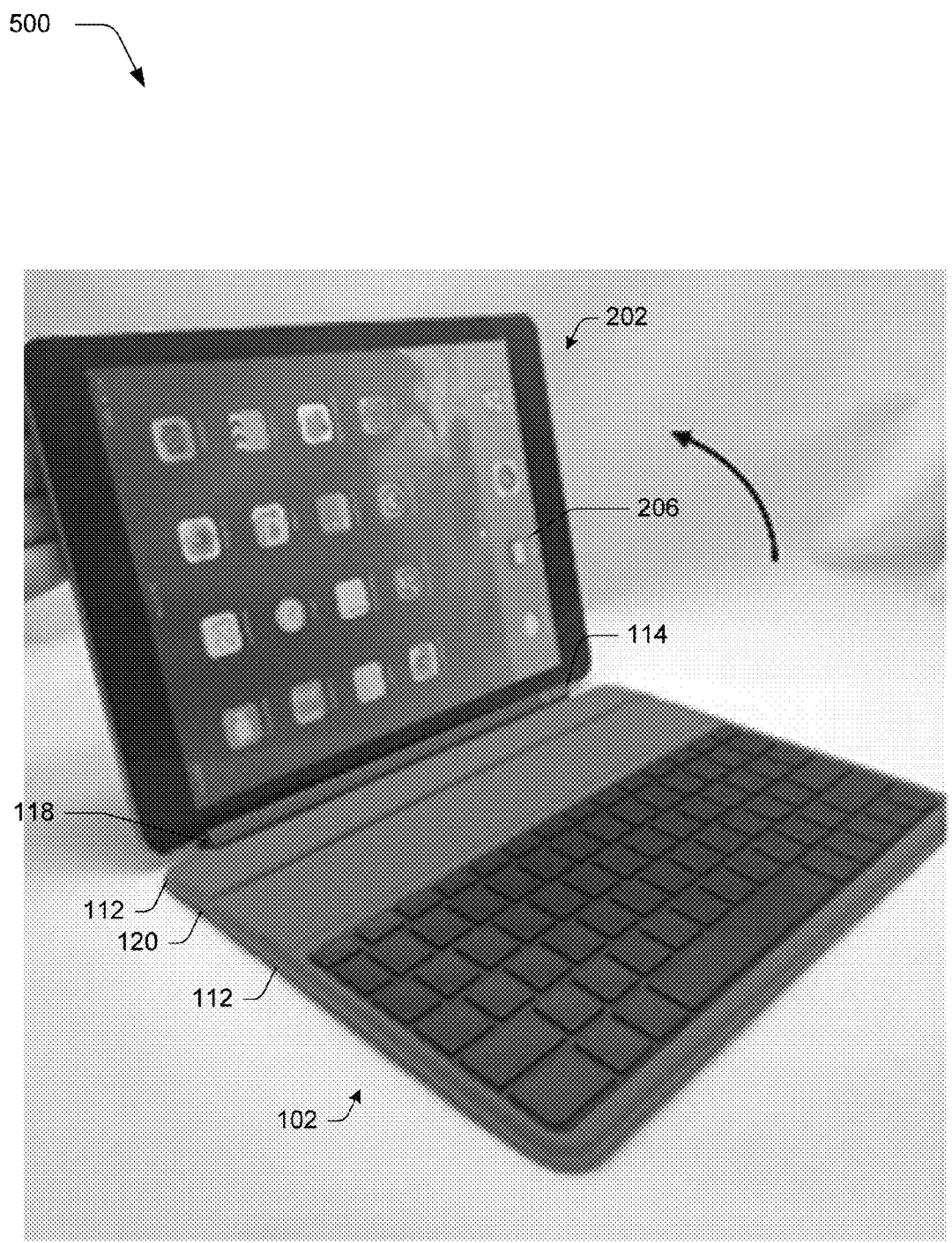
FIGS. 5 and 6 show an example of a transition from a closed configuration of FIG. 4 to a stand configuration of FIG. 2 that is performed without disconnecting and reconnecting the input device to and from the mobile computing device.
Figure 6:
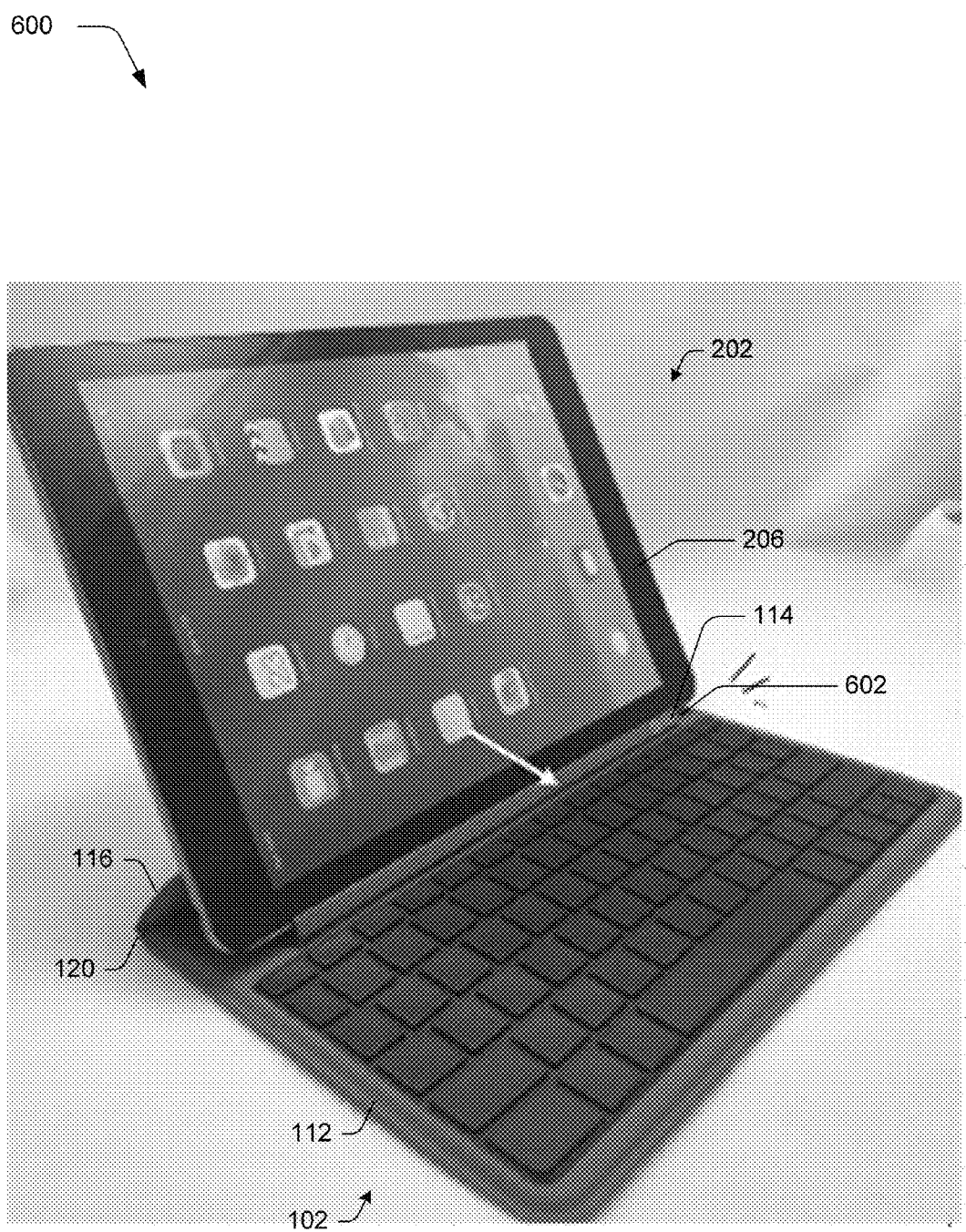

Rotation supported by the flexible hinges 118, 120 and sizing of the support portion 116 may be utilized to support a variety of different configurations in which the input device 102 may be placed in relation to a mobile computing device without detaching and reattaching the connection portion 114 to and from the mobile computing device. Examples of such configurations include a stand configuration (e.g., to support typing via the input portion) as shown in FIGS. 2, 5, and 6, a viewing configuration in which the input portion is not accessible to accept inputs as shown in FIG. 3, and a cover configuration as shown in FIG. 4.

Figure 2:
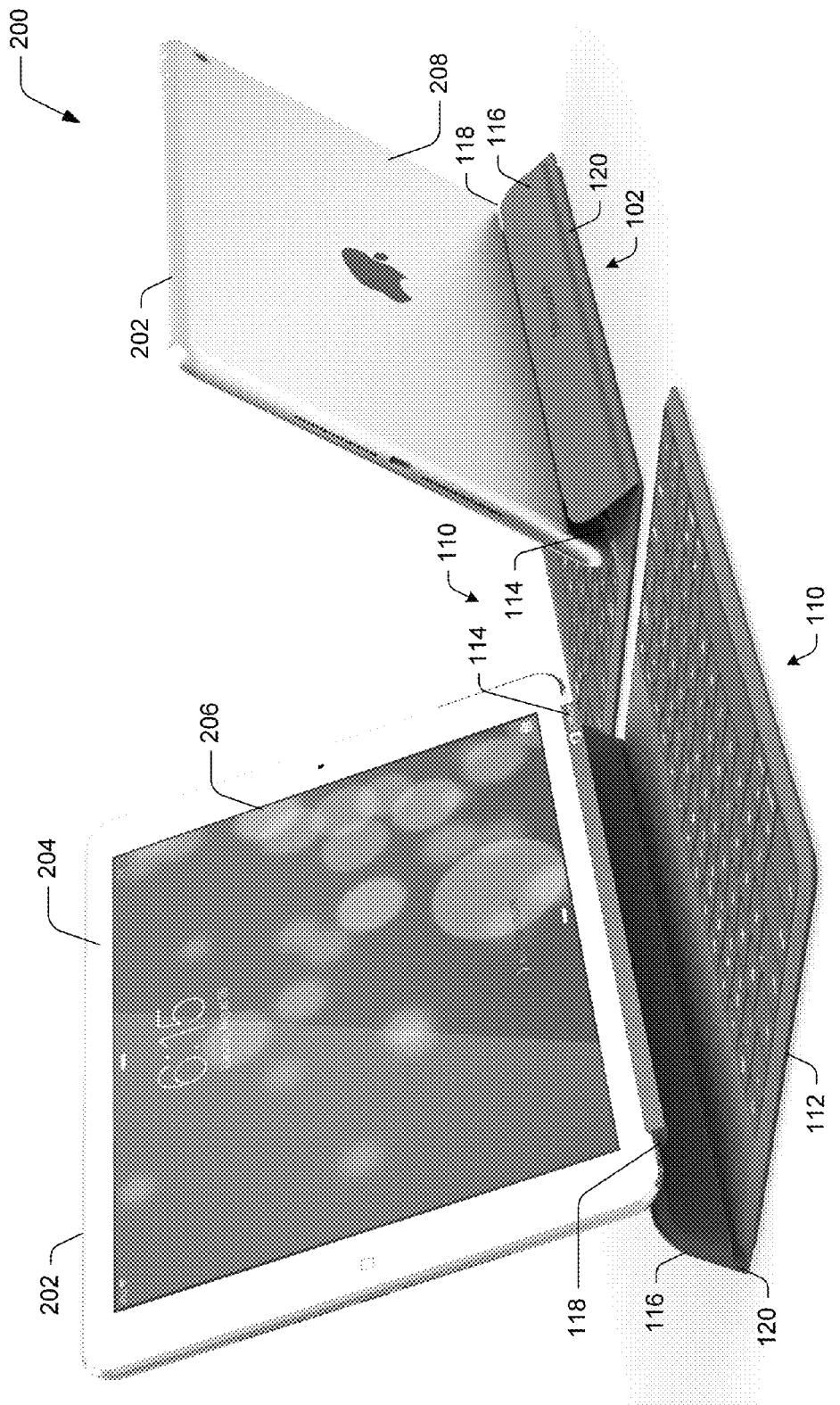
FIG. 2 depicts an example implementation showing the input device of FIG. 1 as assuming a stand configuration in relation to a mobile computing device.

FIG. 2 depicts an example implementation showing the input device 102 of FIG. 1 as assuming a stand configuration 200 in relation to a mobile computing device 202. In this example, the mobile computing device 202 includes a housing configured as a slate that include a front surface 204 having a display device 206 and a rear surface 208 opposite the front surface 204. The connection portion 114 is secured to the mobile computing device 202 using magnetism such that the input device 102 may be secured to and removed from the mobile computing device 202 by one or more hands of a user without use of tools, e.g., by making a motion similar to tearing a page from a book.

In the stand configuration, the connection portion 114 is positioned to rest against an outer surface of the input portion 112. This causes the support portion 116 to be positioned against a rear surface 208 of the mobile computing device 202, thereby supporting the mobile computing device 202 in an upright configuration such that the display device 206 is viewable by a user. Thus, the mobile computing device 202, support portion 116, and input portion 112 form a triangular structure.

Further, as illustrated the sensors 110 (e.g., keys) of the input portion 110 are accessible to a user. In this way, a user may view the display device 206, interact with touchscreen functionality of the display device 206, and interact with the sensors 110 of the input portion 112 to provide inputs to the mobile computing device 202. Additionally, as illustrated the input portion 112 provides a single unhinged surface in this configuration and thus may support use on a variety of different surfaces, including a lap of a user.

FIG. 3 depicts an example implementation showing the input device 102 of FIG. 1 as assuming a viewing configuration 300 in relation to a mobile computing device 202. In the viewing configuration 300, the input device 102 is used as a support to provide angled viewing of the display device 206 of the mobile computing 202. This is performed by rotating the input portion 112 to the rear of (e.g., behind) the housing of the mobile computing device 202. As illustrated, for instance, the sensors 110 (e.g., keys) are placed against a surface, e.g., a desktop, lap of a user, and so on.

Positioning of input portion 112 behind the mobile computing device 202 causes the support portion 116 to rotate to a generally perpendicular position in relation to a surface of the display device 206 and/or a surface of the input portion 112. Accordingly, a height of the support portion 116 may cause a portion of the display device 206 that is closer to the support portion 116 to be elevated in relation to a portion of the display device 206 that is further away, thereby supporting angled viewing of the display device 206.

FIG. 4 depicts an example implementation showing the input device 102 of FIG. 1 as assuming a closed configuration 400 in relation to a mobile computing device 202. In this example, the input portion 112 and the support portion 116 cover the display device 206 of the computing device 102 such that the display device 206 is not viewable by a user, thereby protecting the display from damage. This is performed by rotating the input portion 112 and the support portion 116 into a co-planar relationship in a plane that is parallel to and disposed over the display device 206.

Thus, the input device 102 may be secured to the mobile computing device 202 using magnetism and the portions of the input device 102 may be rotated in relation to each other without detaching the input device 102 to support a variety of configurations and corresponding usage modes of a user. For example, a user may carry the input device 102 as secured to the mobile computing device 202 in the closed configuration 400 as shown in FIG. 4.

A user may then rest the input device 102 on a surface (e.g., a table top) and rotate the mobile computing device 202 in relation to the input device 102 through rotation supported by flexible hinge 114 such that the display device 206 is viewable to a user as shown in the example implementation 500 of FIG. 5 and illustrated through use of an arrow. The connection portion 114 may then be moved to rest against the input portion 112 to assume the support configuration as shown in an example implementation 600 of FIG. 6. In one or more implementations, the input device 102 may include a securing device 602 to secure the connection portion 114 to the input portion 112, such as to place magnets in the input portion 602 that form a magnetic connection to the magnets of the connection portion 114 that are used to also secure the connection portion 114 to the mobile computing device 202. In alternative examples, the connection portion 114 may include a magnet while the securing device may include a metal that is not necessarily a permanent magnet, but is nonetheless attracted to a magnet. A variety of other configurations for the securing device 602 are also contemplated, such as to use a hook and loop configuration, mechanical device, and so forth.

CONCLUSION AND EXAMPLE IMPLEMENTATIONS

Example implementations described herein include, but are not limited to, one or any combinations of one or more of the following examples. In one or more examples, an input device includes a connection portion configured to be secured to a mobile computing device using a magnetic connection that is removable using one or more hands of a user. The input device also includes an input portion having one or more sensors configured to generate inputs responsive to user interaction and a support portion that is rotationally secured to the input portion and the connection portion and effective to assume a cover configuration in which the support portion and the input portion are positioned to cover a display device of the mobile computing device. The input device further includes a wireless communication device configured to communicate the generated inputs to the mobile computing device that are usable to initiate one or more operations of the mobile computing device.

In one or more examples, an input device comprises a connection portion configured to be secured to a mobile computing device using a magnetic connection, an input portion having one or more sensors configured to generate inputs responsive to user interaction, a support portion rotationally secured to the input portion and the connection portion and effective to assume a cover configuration in which the support portion and the input portion are positioned to cover a display device of the mobile computing device, and further effective to assume a stand configuration in which the support portion and the input portion are position at an acute angle with respect to one another, and an operating system selection key operable to select from a plurality of operating systems.

An input device as described alone in in combination with any of the above or below examples, wherein positioning of the support portion and the input portion forms a coplanar relationship to cover the display device.

An input device as described alone in in combination with any of the above or below examples, wherein the input portion is rotatable in relation to the support portion and the connection portion is rotatable in relation to the mobile computing device to assume a stand configuration that supports the mobile computing device upright such that a display device of the mobile computing device is viewable by a user and the one or more sensors are accessible by the user.

An input device as described alone or in combination with any of the above or below examples, further comprising one or more sensors configured to disable wireless communication of the wireless communication device responsive to detection that the input device is not in the stand configuration.

An input device as described alone or in combination with any of the above or below examples, further comprising one or more magnets configured to secure the connection portion to the input portion when in the stand configuration.

An input device as described alone or in combination with any of the above or below examples, wherein the input portion is rotatable in relation to the support portion and the connection portion is rotatable in relation to the mobile computing device to assume a viewing configuration in which the display device of the mobile computing device is positioned for viewing by a user and position the input portion to a rear of the mobile computing device opposite the display device.

An input device as described alone or in combination with any of the above or below examples, wherein the support portion is positioned generally perpendicular to the display device and the input portion such that when placed on a surface.

An input device as described alone or in combination with any of the above or below examples, wherein the support portion is rotationally secured to the input portion using a flexible hinge.

An input device as described alone or in combination with any of the above or below examples, wherein the support portion is rotationally secured to the connection portion using a flexible hinge.

An input device as described alone or in combination with any of the above or below examples, wherein the support portion is rotationally secured to the input portion and the connection portion using fabric.

An input device as described alone or in combination with any of the above or below examples, wherein the one or more sensors are configured as mechanical keys, pressure sensitive keys, or capacitive sensors.

An input device as described alone or in combination with any of the above or below examples, wherein the connection portion includes one or more magnets having a complementary shape of a housing of the mobile computing device.

In one or more examples, a keyboard includes a connection portion configured to be secured to a mobile computing device using a magnetic connection that is removable using one or more hands of a user. The keyboard also includes an input portion having one or more sensors configured to generate inputs responsive to user interaction and a support portion rotationally secured to the input portion using a flexible hinge and rotationally secured to the connection portion using a flexible hinge. The keyboard further includes a wireless communication device configured to communicate the generated inputs to the mobile computing device that are usable to initiate one or more operations of the mobile computing device.

In one or more examples, a keyboard comprises a connection portion configured to be secured to a mobile computing device using a magnetic connection that is removable using one or more hands of a user; an input portion having one or more sensors configured to generate inputs responsive to user interaction; a support portion rotationally secured to the input portion using a flexible hinge and rotationally secured to the connection portion using a flexible hinge, the support portion effective to assume a cover configuration in which the support portion and the input portion are positioned to cover a display device of the mobile computing device, and further effective to assume a stand configuration in which the support portion and the input portion are position at an acute angle with respect to one another; and an operating system selection key operable to select from a plurality of operating systems.

A keyboard as described alone or in combination with any of the above or below examples, wherein the flexible hinges are formed using a fabric.

A keyboard as described alone or in combination with any of the above or below examples, wherein the input portion is rotatable in relation to the support portion and the connection portion is rotatable in relation to the mobile computing device to assume a stand configuration that supports the mobile computing device upright such that a display device of the mobile computing device is viewable by a user and the one or more sensors are accessible by the user.

A keyboard as described alone or in combination with any of the above or below examples, wherein the input portion is rotatable in relation to the support portion and the connection portion is rotatable in relation to the mobile computing device to assume a viewing configuration in which a display device of the mobile computing device is positioned for viewing by a user and position the input portion to a rear of the mobile computing device opposite the display device.

A keyboard as described alone or in combination with any of the above or below examples, wherein the input portion is rotatable in relation to the support portion and the connection portion is rotatable in relation to the mobile computing device to assume a cover configuration in which the support portion and the input portion are positioned to cover a display device of the mobile computing device.

In one or more examples, a keyboard includes a connection portion configured to be secured to a mobile computing device using a magnetic connection that is removable using one or more hands of a user. The keyboard also includes an input portion having one or more sensors configured to generate inputs responsive to user interaction and a support portion rotationally secured to the input portion and rotationally secured to the connection portion using a fabric that extends from the connection portion and across the support portion to the input portion. The keyboard further includes a wireless communication device configured to communicate the generated inputs to the mobile computing device that are usable to initiate one or more operations of the mobile computing device.

In one or more examples, a keyboard includes a connection portion configured to be secured to a mobile computing device using a magnetic connection that is removable using one or more hands of a user; an input portion having one or more sensors configured to generate inputs responsive to user interaction; a support portion rotationally secured to the input portion and rotationally secured to the connection portion using a fabric that extends from the connection portion and across the support portion to the input portion; and an operating system selection key operable to select from a plurality of operating systems.

A keyboard as described alone or in combination with any of the above or below examples, wherein the input portion is rotatable in relation to the support portion and the connection portion is rotatable in relation to the mobile computing device to assume a plurality of configurations without detaching the connection portion from the mobile computing device, the plurality of configurations including: a stand said configuration that supports the mobile computing device upright such that a display device of the mobile computing device is viewable by a user and the one or more sensors are accessible by the user; a viewing said configuration in which a display device of the mobile computing device is positioned for viewing by a user and position the input portion to a rear of the mobile computing device opposite the display device; and a cover said configuration in which the support portion and the input portion are positioned to cover a display device of the mobile computing device.

A keyboard as described alone or in combination with any of the above or below examples, wherein the mobile computing device is a mobile phone or tablet.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising: a connection portion configured to be secured to a mobile computing device using a magnetic connection; an input portion having one or more sensors configured to generate inputs responsive to user interaction; a support portion being rotatable in relation to the input portion and the connection portion is rotatable in relation to the mobile computing device to assume a viewing configuration, the support portion rotationally secured to the input portion and the connection portion and effective to assume a cover configuration in which the support portion and the input portion are both positioned to cover a display device of the mobile computing device, and further effective to assume a stand configuration in which the support portion and the input portion are positioned at an acute angle with respect to one another; and an operating system selection key operable to select from a plurality of operating systems.

2. An input device as described in claim 1, wherein positioning of the support portion and the input portion forms a coplanar relationship to cover the display device.

3. An input device as described in claim 1, wherein the input portion is rotatable in relation to the support portion and the connection portion is rotatable in relation to the mobile computing device to assume a stand configuration that supports the mobile computing device upright such that a display device of the mobile computing device is viewable by a user and the one or more sensors are accessible by the user.

4. An input device as described in claim 3, further comprising one or more sensors configured to disable wireless communication of a wireless communication device responsive to detection that the input device is not in the stand configuration.

5. An input device as described in claim 3, further comprising one or more magnets configured to secure the connection portion to the input portion when in the stand configuration.

6. An input device as described in claim 1, wherein the viewing configuration includes the display device of the mobile computing device is positioned for viewing by a user and the input portion is positioned to a rear of the mobile computing device opposite the display device.

7. An input device as described in claim 6, wherein the support portion is positioned generally perpendicular to the display device and the input portion such that when placed on a surface a portion of the display device that is closer to the support portion is elevated in relation to a portion of the display device that is further from the support portion to support angled viewing of the display device.

8. An input device as described in claim 1, wherein the support portion is rotationally secured to the input portion using a flexible hinge.

9. An input device as described in claim 1, wherein the support portion is rotationally secured to the connection portion using a flexible hinge.

10. An input device as described in claim 1, wherein the support portion is rotationally secured to the input portion and the connection portion using fabric.

11. An input device as described in claim 1, wherein the one or more sensors are configured as mechanical keys, pressure sensitive keys, or capacitive sensors.

12. An input device as described in claim 1, wherein the connection portion includes one or more magnets having a complementary shape of a housing of the mobile computing device.

13. A keyboard comprising: a connection portion configured to be secured to a mobile computing device using a magnetic connection that is removable using one or more hands of a user; an input portion having one or more sensors configured to generate inputs responsive to user interaction; a support portion being rotatable in relation to the input portion and the connection portion is rotatable in relation to the mobile computing device to assume a stand configuration, the support portion rotationally secured to the input portion using a flexible hinge and rotationally secured to the connection portion using a flexible hinge, the support portion effective to assume a cover configuration in which the support portion and the input portion are both positioned to cover a display device of the mobile computing device, and further effective to assume the stand configuration in which the support portion and the input portion are positioned at an acute angle with respect to one another; and an operating system selection key operable to select from a plurality of operating systems.

14. A keyboard as described in claim 13, wherein the flexible hinges are formed using a fabric.

15. A keyboard as described in claim 13, wherein the stand configuration supports the mobile computing device upright such that a display device of the mobile computing device is viewable by a user and the one or more sensors are accessible by the user.

16. A keyboard as described in claim 13, wherein the input portion is rotatable in relation to the support portion and the connection portion is rotatable in relation to the mobile computing device to assume a viewing configuration in which a display device of the mobile computing device is positioned for viewing by a user and the input portion is positioned to a rear of the mobile computing device opposite the display device.

17. A keyboard as described in claim 13, wherein the input portion is rotatable in relation to the support portion and the connection portion is rotatable in relation to the mobile computing device to assume a cover configuration in which the support portion and the input portion are positioned to cover a display device of the mobile computing device.

18. A keyboard comprising: a connection portion configured to be secured to a mobile computing device using a magnetic connection that is removable using one or more hands of a user; an input portion having one or more sensors configured to generate inputs responsive to user interaction; a support portion being rotatable in relation to the input portion and the connection portion is rotatable in relation to the mobile computing device to assume a plurality of configurations, the support portion rotationally secured to the input portion and rotationally secured to the connection portion using a fabric that extends from the connection portion and across the support portion to the input portion, the support portion implemented for a dual purpose as a cover configuration in which both the support portion and the input portion are positioned to cover a display device of the mobile computing device, and further as a stand configuration in which the support portion and the input portion are positioned at an acute angle with respect to one another; and an operating system selection key operable to select from a plurality of operating systems.

19. A keyboard as described in claim 18, wherein the plurality of configurations including: the stand said configuration that supports the mobile computing device upright such that a display device of the mobile computing device is viewable by a user and the one or more sensors are accessible by the user; a viewing said configuration in which the display device of the mobile computing device is positioned for viewing by the user and the input portion is positioned to a rear of the mobile computing device opposite the display device; and a cover said configuration in which the support portion and the input portion are both positioned to cover the display device of the mobile computing device.

20. A keyboard as described in claim 18, wherein the mobile computing device is a mobile phone or tablet.

\* \* \* \* \*